(12) United States Patent
Yang et al.

(10) Patent No.: US 9,631,158 B2
(45) Date of Patent: Apr. 25, 2017

(54) PROCESSES FOR PREPARING LOW VISCOSITY LUBRICANTS

(71) Applicant: Chevron Phillips Chemical Company LP, The Woodlands, TX (US)

(72) Inventors: Hu Yang, Manvel, TX (US); Kenneth D. Hope, Kingwood, TX (US); Jeff C. Gee, Kingwood, TX (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 269 days.

(21) Appl. No.: 14/568,149

(22) Filed: Dec. 12, 2014

(65) Prior Publication Data

US 2015/0099679 A1 Apr. 9, 2015

Related U.S. Application Data

(62) Division of application No. 13/798,253, filed on Mar. 13, 2013, now abandoned.

(51) Int. Cl.
*C10M 107/00* (2006.01)
*C07C 9/22* (2006.01)
(Continued)

(52) U.S. Cl.
CPC ............ *C10M 107/10* (2013.01); *B01J 31/10* (2013.01); *B01J 31/143* (2013.01); *B01J 31/2295* (2013.01); *C08F 110/14* (2013.01); *C10G 45/00* (2013.01); *C10G 50/00* (2013.01); *C10G 50/02* (2013.01); *C10G 69/126* (2013.01);
(Continued)

(58) Field of Classification Search
CPC .... C10M 107/10; C08F 110/14; B01J 31/143; B01J 31/2295; B01J 31/10; B01J 2531/48; B01J 2531/49; B01J 2231/20; C10G 69/126; C10G 45/00; C10G 50/02; C10G 50/00; C10G 2300/1088; C10G 2400/10
See application file for complete search history.

(56) References Cited

U.S. PATENT DOCUMENTS 3,940,452 A 2/1976 Strassberger
3,957,664 A 5/1976 Heilman et al.
(Continued)

FOREIGN PATENT DOCUMENTS

CA 1 034 967 7/1978
FR 2 302 289 9/1976
(Continued)

OTHER PUBLICATIONS

Kissin et al, entitled "Post-Oligomerization of α-Olefin Oligomers: A Route to Single-Component and Multicomponent Synthetic Lubricating Oils," published in the *Journal of Applied Polymer Science*, vol. 111, (2009), pp. 273-280.
(Continued)

*Primary Examiner* — Pamela H Weiss
(74) *Attorney, Agent, or Firm* — Merchant & Gould P.C.

(57) ABSTRACT

Disclosed are processes for forming an oligomer product by contacting a feedstock olefin containing trisubstituted olefins with a solid acid catalyst. The oligomer product can be formed at an oligomerization temperature in a range from −20° C. to 40° C. Polyalphaolefins produced from the oligomer product can have reduced viscosities at low temperatures.

15 Claims, 5 Drawing Sheets

(51) Int. Cl.

| | | |
|---|---|---|
| C08F 110/14 | (2006.01) | |
| C10M 107/10 | (2006.01) | |
| C10G 50/00 | (2006.01) | |
| C10G 50/02 | (2006.01) | |
| C10G 45/00 | (2006.01) | |
| C10G 69/12 | (2006.01) | |
| B01J 31/10 | (2006.01) | |
| B01J 31/14 | (2006.01) | |
| B01J 31/22 | (2006.01) | |

(52) U.S. Cl.
CPC ........ *B01J 2231/20* (2013.01); *B01J 2531/48* (2013.01); *B01J 2531/49* (2013.01); *C10G 2300/1088* (2013.01); *C10G 2400/10* (2013.01)

(56) References Cited

U.S. PATENT DOCUMENTS

| | | |
|---|---|---|
| 4,029,601 A | 6/1977 | Wiese |
| 4,150,062 A | 4/1979 | Garwood et al. |
| 4,172,855 A | 10/1979 | Shubkin et al. |
| 4,469,912 A | 9/1984 | Blewett et al. |
| 4,531,014 A | 7/1985 | Gregory et al. |
| 4,547,613 A | 10/1985 | Garwood et al. |
| 4,658,078 A | 4/1987 | Slaugh et al. |
| 4,697,040 A | 9/1987 | Williamson et al. |
| 4,870,038 A | 9/1989 | Page et al. |
| 4,973,788 A | 11/1990 | Lin et al. |
| 5,053,569 A | 10/1991 | Marquis et al. |
| 5,087,788 A | 2/1992 | Wu |
| 5,191,130 A | 3/1993 | Sanderson et al. |
| 5,284,988 A | 2/1994 | Schaerfl, Jr. et al. |
| 5,292,443 A | 3/1994 | Esche, Jr. et al. |
| 5,498,815 A | 3/1996 | Schaerfl, Jr. et al. |
| 6,407,302 B1 | 6/2002 | Twu et al. |
| 6,548,723 B2 | 4/2003 | Bagheri et al. |
| 6,639,118 B1 | 10/2003 | McKinnie et al. |
| 6,680,417 B2 | 1/2004 | Bagheri et al. |
| 7,078,579 B2 | 7/2006 | Doll et al. |
| 7,273,957 B2 | 9/2007 | Bakshi et al. |
| 7,294,599 B2 | 11/2007 | Jensen et al. |
| 7,332,637 B2 | 2/2008 | Gee et al. |
| 7,989,670 B2 | 8/2011 | Wu et al. |
| 8,067,652 B2 | 11/2011 | Burton et al. |
| 8,207,390 B2 | 6/2012 | Wu et al. |
| 2007/0043248 A1* | 2/2007 | Wu .......................... C07C 5/05 585/521 |
| 2007/0225534 A1* | 9/2007 | Goze ...................... C10G 50/02 585/525 |
| 2008/0146469 A1 | 6/2008 | Sato et al. |
| 2009/0240012 A1 | 9/2009 | Patil et al. |
| 2009/0270296 A1 | 10/2009 | Patil et al. |
| 2010/0137668 A1 | 6/2010 | Loescher et al. |
| 2010/0317904 A1* | 12/2010 | Small ...................... C08F 10/14 585/18 |
| 2013/0253244 A1 | 9/2013 | Emett et al. |
| 2014/0179964 A1 | 6/2014 | Gee |
| 2014/0275664 A1 | 9/2014 | Yang et al. |

FOREIGN PATENT DOCUMENTS

| | | |
|---|---|---|
| JP | 2008-143958 | 6/2008 |
| WO | WO 2009/073135 | 6/2009 |
| WO | WO 2009/117110 | 9/2009 |
| WO | WO 2013/055483 | 4/2013 |

OTHER PUBLICATIONS

Honkela et al, entitled "Comparison of Ion-Exchange Resin Catalysts in the Dimerisation of Isobutene," published by Elsevier B.V., *Applied Catalysis A: General* 295 (2005), pp. 216-223.

Honkela et al., entitled "Kinetic Modeling of the Dimerization of Isobutene," published by American Chemical Society, *Ind. Eng. Chem. Res.* 2004, vol. 43, pp. 3251-3260.

DiGirolamo et al, entitled "Liquid-Phase Etherification/Dimerization of Isobutene over Sulfonic Acid Resins," published by American Chemical Society, *Ind. Eng. Chem. Res.* 1997, vol. 36, pp. 4452-4458.

Cruz et al, entitled "Conversion, Selectivity and Kinetics of the Liquid-Phase Dimerisation of Isoamylenes in the Presence of $C_1$ to $C_5$ Alcohols Catalysed by a Macroporous Ion-Exchange Resin," published by Elsevier Inc., *Journal of Catalysis* 238 (2006), pp. 330-341.

Shah, et al, entitled "Dimerization of Isoamylene: Ion Exchange Resin and Acid-Treated Clay as Catalysts," published by Elsevier Science Publishers B.V., Amsterdam, *Reactive Polymers*, vol. 19 (1993), pp. 181-190.

Shah, et al, entitled "Cross-Dimerization of α-Methylstyrene with Isoamylene and Aldol Condensation of Cyclohexanone Using a Cation-Exchange Resin and Acid-Treated Clay Catalysts," published by Elsevier Science B.V., Amsterdam, *Reactive Polymers*, vol. 22 (1994), pp. 19-34.

Cruz, et al, entitled "Kinetic Modelling of the Liquid-Phase Dimerization of Isoamylenes on Amberlyst 35," published by Elsevier Ltd., *Reactive & Functional Polymers*, vol. 67 (2007), pp. 210-224.

Haag, W.O. entitled "Oligomerization of Isobutylene on Cation Exchange Resins," published by *Chemical Engineering Progress, Symposium Series*, No. 73, vol. 63, (1967), pp. 140-146.

Schwarzer, et al, entitled "Kinetic Model for the Dimerisation of 1-Hexene Over a Solid Phosphoric Acid Catalyst," published by Elsevier B.V., *Applied Catalysis A: General* 340 (2008), pp. 119-124.

O'Connor et al, entitled "Alkene Oligomerization," published by 1990 Elsevier Science Publishers B.V., pp. 329-349.

Nierlich et al, entitled "Symposium on Alkylation, Aromatization, Oligomerization and Isomerization of Short Chain Hydrocarbons over Heterogeneous Catalysts," Presented before the Division of Petroleum Chemistry, Inc. American Chemical Society, New York City Meeting, Aug. 25-30, 1991, pp. 585-595.

Friedlander, Henry Z., *American Machine & Foundry Company, Springdale, Connecticut*, entitled "Organized Polymerization. I. Olefins on a Clay Surface," (1963) published by Journal of Polymer Science: Part C, No. 4, pp. 1291-1301.

De Klerk, et al, entitled "Butene Oligomerization by Phosphoric Acid Catalysis: Separating the Effects of Temperature and Catalyst Hydration on Product Selectivity," published by American Chemical Society, *Ind. Eng. Chem. Res.* 2006, vol. 45, pp. 6127-6136.

Adams, J. M. entitled "Synthetic Organic Chemistry Using Pillared, Cation-Exchanged and Acid-Treated Montmorillonite Catalysts—A Review," published by Elsevier Science Publishers B.V., *Applied Clay Science*, vol. 2, (1987), pp. 309-342.

Chiche, et al, entitled "Butene Oligomerization Over Mesoporous MTS-Type Aluminosilicates," published by Elsevier Science B.V., *Journal of Molecular Catalysis A: Chemical* 134 (1998), pp. 145-157.

Yoon, et al, entitled "Trimerization of Isobutene Over Cation Exchange Resins: Effect of Physical Properties of the Resins and Reaction Conditions," published by Elsevier B.V., *Journal of Molecular Catalysis A: Chemical* 260 (2006), pp. 181-186.

Kresnawahjuesa, et al, entitled "An Examination of Brønsted Acid Sites in H-[Fe]ZSM-5 for Olefin Oligomerization and Adsorption," published by Elsevier Science (USA), *Journal of Catalysis*, 2002, vol. 210, pp. 106-115.

Pater, et al. entitled "Oligomerization of Hex-1-ene Over Acidic Aluminosilicate Zeolites, MCM-41, and Silica-Alumina Co-gel Catalysts: A Comparative Study," published by Academic Press, Inc., *Journal of Catalysis*, vol. 184 (1999), pp. 262-267.

Sun et al, entitled "Dimerization of α-Methylstyrene (AMS) Catalyzed by Sulfonic Acid Resins: A Quantitative Kinetic Study," published by Academic Press, Inc., *Journal of Catalysis*, vol. 164, (1996), pp. 62-69.

Chaudhuri et al, entitled "Some Novel Aspects of the Dimerization of α-Methylstyrene with Acidic Ion-Exchange Resins, Clays, and

(56) References Cited

OTHER PUBLICATIONS

Other Acidic Materials as Catalysts," published by American Chemical Society, *Ind. Eng. Chem. Res.* 1989, vol. 28, pp. 1757-1763.

Dixit et al, entitled "Deactivation of Ion-Exchange Resin Catalysts. Part II: Simulation by Network Models," published by Elsevier Science B.V., *Reactive & Functional Polymers*, vol. 31, (1996), pp. 251-263.

Kazansky, V.B. entitled "Solvation as a Main Factor that Determines the Strength of Liquid Superacids and the Selectivity of the Acid-Catalyzed Reactions of Olefins," published by Elsevier Science B.V., *Catalysis Today*, vol. 73 (2002), pp. 127-137.

Heveling et al, entitled "Chain-Length Distributions Obtained Over Nickel(II)-Exchanged or Impregnated Silica-Alumina Catalysts for the Oligomerization of Lower Alkenes," published by Springer Science+Business Media, Inc., *Catalysis Letters*, vol. 107, Nos. 1-2, Feb. 2006, pp. 117-121.

Hauge, et al, entitled "Oligomerization of Isobutene Over Solid Acid Catalysts," published by Elsevier B.V., *Catalysis Today*, vol. 100 (2005), pp. 463-466.

Gu et al, entitled "$SO_3H$-Functionalized Ionic Liquid as Efficient, Green and Reusable Acidic Catalyst System for Oligomerization of Olefins," published by Elsevier B.V., *Catalysis Communications*, vol. 4 (2003), pp. 597-601.

Coetzee, et al, entitled "An Improved Solid Phosphoric Acid Catalyst for Alkene Oligomerization in a Fischer-Tropsch Refinery," published by Elsevier B.V., *Applied Catalysis A: General* 308 (2006), pp. 204-209.

Schmidt et al, entitled "Oligomerization of $C_5$ Olefins in Light Catalytic Naphtha," published by American Chemical Society, *Energy & Fuels* 2008, vol. 22, pp. 1148-1155.

International Search Report and Written Opinion of the International Search Authority in International Application No. PCT/US2014/022636 dated May 16, 2014, 8 pages, (87woul).

Publication entitled "ChemSpider" at http://www.chemspider.com/Chemical-Structure.22445.html (2014), 2 pgs.

Smith, Robin, entitled "Chemical Process Design and Integration," Centre for Process Integration, School of Chemical Engineering & Analytical Science, Univ. of Manchester, John Wiley & Sons, (2005), pp. 259-261.

* cited by examiner

13C NMR
1- Decene Dimer (C20)
of Example 2

PROCESSES FOR PREPARING LOW VISCOSITY LUBRICANTS

REFERENCE TO RELATED APPLICATION

This application is a divisional application of co-pending U.S. patent application Ser. No. 13/798,253, filed on Mar. 13, 2013, the disclosure of which is incorporated herein by reference in its entirety.

BACKGROUND OF THE INVENTION

The present invention relates generally to processes for oligomerizing olefins using a solid acid catalyst, and to the production of low viscosity polyalphaolefins for use in lubricant formulations and other related end-use applications.

SUMMARY OF THE INVENTION

This summary is provided to introduce a selection of concepts in a simplified form that are further described herein. This summary is not intended to identify required or essential features of the claimed subject matter. Nor is this summary intended to be used to limit the scope of the claimed subject matter.

Processes for oligomerizing olefins in the presence of a solid acid catalyst to form an oligomer product are disclosed herein. In accordance with an embodiment of the present invention, one such process can comprise contacting a feedstock olefin (e.g., containing trisubstituted olefins) with a solid acid catalyst to form the oligomer product at an oligomerization temperature in a range from −2.0° C. to 40° C. Subsequently, some or all of the oligomer product can be hydrogenated to produce a polyalphaolefin.

In another embodiment, a process for forming a polyalphaolefin is disclosed, and in this embodiment, the process can comprise (1) contacting a monomer comprising a $C_6$ to $C_{24}$ normal alpha olefin with a catalyst system to form a dimer composition comprising trisubstituted dimers, the catalyst system comprising a metallocene compound, a chemically-treated solid oxide, and a co-catalyst; (2) removing at least a portion of the monomer and/or at least a portion of higher oligomers from the dimer composition to form a trisubstituted olefin composition comprising trisubstituted dimers; (3) contacting the trisubstituted olefin composition with a solid acid catalyst to form an oligomer product comprising olefin tetramers at an oligomerization temperature in a range from −20° C. to 40° C. (4) removing at least a portion of the oligomer product from the trisubstituted dimers and the solid acid catalyst to form a tetramer composition comprising olefin tetramers; and (5) hydrogenating the tetramer composition to form the polyalphaolefin.

In another embodiment, a process for forming a polyalphaolefin is disclosed, and in this embodiment, the process can comprise (1) contacting a monomer comprising a $C_6$ to $C_{24}$ normal alpha olefin with a catalyst system to form a reaction product comprising dimers, the catalyst system comprising a metallocene compound and an aluminoxane or a non-coordinating anion activator and an alkylaluminum compound; (2) removing at least a portion of the monomer and/or at least a portion of higher oligomers from the reaction product to form a vinylidene composition comprising vinylidenes; (3) isomerizing the vinylidene composition comprising vinylidenes to form a trisubstituted olefin composition comprising trisubstituted dimers; (4) contacting the trisubstituted olefin composition with a solid acid catalyst to form an oligomer product comprising olefin tetramers at an oligomerization temperature in a range from −20° C. to 40° C.; (5) removing at least a portion of the oligomer product from the trisubstituted dimers and the solid acid catalyst to form a tetramer composition comprising olefin tetramers; and (6) hydrogenating the tetramer composition to form the polyalphaolefin.

In yet another embodiment, a process for forming a polyalphaolefin is disclosed, and in this embodiment, the process can comprise (1) contacting a monomer comprising a $C_6$ to $C_{24}$ normal alpha olefin with a catalyst system to form a reaction product comprising dimers, the catalyst system comprising an alkylaluminum compound; (2) removing at least a portion of the monomer and/or at least a portion of higher oligomers from the reaction product to form a vinylidene composition comprising vinylidenes; (3) isomerizing the vinylidene composition comprising vinylidenes to form a trisubstituted olefin composition comprising trisubstituted dimers; (4) contacting the trisubstituted olefin composition with a solid acid catalyst to form an oligomer product comprising olefin tetramers at an oligomerization temperature in a range from −20° C. to 40° C.; (5) removing at least a portion of the oligomer product from the trisubstituted dimers and the solid acid catalyst to form a tetramer composition comprising olefin tetramers; and (6) hydrogenating the tetramer composition to form the polyalphaolefin.

In still another embodiment, a process for forming a polyalphaolefin is disclosed, and in this embodiment, the process can comprise (A) contacting a feedstock olefin comprising a $C_{20}$ trisubstituted olefin with a solid acid catalyst to form an oligomer product comprising a $C_{40}$ olefin at an oligomerization temperature in a range from −20° C. to 40° C.; (B) removing at least a portion of the oligomer product comprising the $C_{40}$ olefin from the feedstock olefin, the acid catalyst, solvent (if utilized), etc.; and (C) hydrogenating the portion of the oligomer product comprising the $C_{40}$ olefin of step (B) to form the polyalphaolefin.

These processes can provide unexpectedly low viscosity polyalphaolefins at low temperatures (e.g., sub-zero temperatures) and/or unexpectedly high olefin conversion in the presence of the solid acid catalyst.

Other embodiments consistent with the present invention are directed to polyalphaolefins. Such polyalphaolefins can contain, for instance, at least 80 wt. % $C_{40}$ saturated branched hydrocarbons, a maximum of 5 wt, %<$C_{40}$ hydrocarbons, and have a kinematic viscosity at −40° C. in a range from 4,500 to 9,500 cSt, or from 5,000 to 9,000 cSt. These polyalphaolefins also can have a kinematic viscosity at 40° C. in a range from 25 to 50 cSt, a kinematic viscosity at 100° C. in a range from 4 to 10 cSt, a viscosity index in a range from 120 to 150, and a pour point in a range from −45 to −85° C. In some embodiments, the present invention is directed to polyalphaolefins produced by the processes described herein.

Both the foregoing summary and the following detailed description provide examples and are explanatory only. Accordingly, the foregoing summary and the following detailed description should not be considered to be restrictive. Further, features or variations can be provided in addition to those set forth herein. For example, certain embodiments can be directed to various feature combinations and sub-combinations described in the detailed description.

DEFINITIONS

Figure 1:
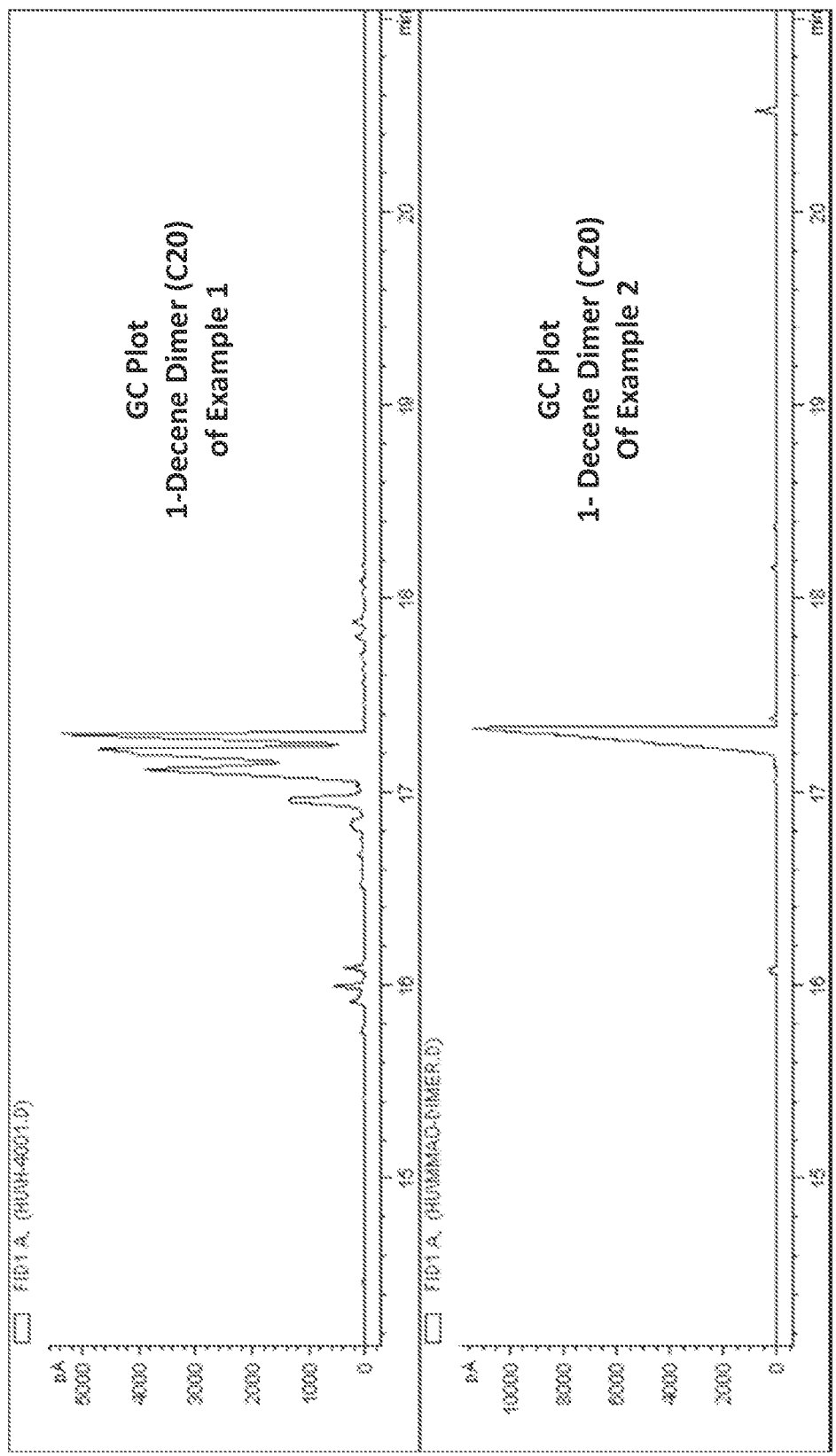
FIG. 1 presents gas chromatography plots of the 1-decene dimer ($C_{20}$) of Example 1 and the 1-decene dimer ($C_{20}$) of Example 2.

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2$^{nd}$ Ed (1997), can be applied, as long as that definition does not conflict with any other disclosure or definition applied herein, or render indefinite or non-enabled any claim to which that definition can be applied. To the extent that any definition or usage provided by any document incorporated herein by reference conflicts with the definition or usage provided herein, the definition or usage provided herein controls.

Regarding claim transitional terms or phrases, the transitional term "comprising," which is synonymous with "including," "containing," "having," or "characterized by," is open-ended and does not exclude additional, unrecited elements or method steps. The transitional phrase "consisting of" excludes any element, step, or ingredient not specified in the claim. The transitional phrase "consisting essentially of" limits the scope of a claim to the specified materials or steps and those that do not materially affect the basic and novel characteristic(s) of the claimed invention. A "consisting essentially of" claim occupies a middle ground between closed claims that are written in a "consisting of" format and fully open claims that are drafted in a "comprising" format. Absent an indication to the contrary, describing a compound or composition as "consisting essentially of" is not to be construed as "comprising," but is intended to describe the recited component that includes materials which do not significantly alter the composition or method to which the term is applied. For example, a feedstock consisting essentially of a material A can include impurities typically present in a commercially produced or commercially available sample of the recited compound or composition. When a claim includes different features and/or feature classes (for example, a method step, feedstock features, and/or product features, among other possibilities), the transitional terms comprising, consisting essentially of, and consisting of apply only to the feature class to which it is utilized, and it is possible to have different transitional terms or phrases utilized with different features within a claim. For example, a method can comprise several recited steps (and other non-recited steps), but utilize a catalyst consisting of specific components; alternatively, consisting essentially of specific components; or alternatively, comprising the specific components and other non-recited components. While compositions and methods are described in terms of "comprising" various components or steps, the compositions and methods can also "consist essentially of" or "consist of" the various components or steps, unless specifically stated otherwise. For example, a monomer consistent with certain embodiments of the present invention can comprise; alternatively, consist essentially of; or alternatively, consist of; a $C_6$ to $C_{24}$ normal alpha olefin.

The terms "a," "an," and "the" are intended to include plural alternatives, e.g., at least one, unless otherwise specified. For instance, the disclosure of "a solid acid catalyst" is meant to encompass one, or mixtures or combinations of more than one, solid acid catalyst, unless otherwise specified.

For any particular compound or group disclosed herein, any name or structure presented is intended to encompass all conformational isomers, regioisomers, and stereoisomers that can arise from a particular set of substituents, unless otherwise specified. For example, a general reference to pentane includes n-pentane, 2-methyl-butane, and 2,2-dimethylpropane, and a general reference to a butyl group includes an n-butyl group, a sec-butyl group, an iso-butyl group, and a t-butyl group. The name or structure also encompasses all enantiomers, diastereomers, and other optical isomers whether in enantiomeric or racemic forms, as well as mixtures of stereoisomers, as would be recognized by a skilled artisan, unless otherwise specified.

A chemical "group" can be defined or described according to how that group is formally derived from a reference or "parent" compound, for example, by the number of hydrogen atoms removed from the parent compound to generate the group, even if that group is not literally synthesized in such a manner. These groups can be utilized as substituents. By way of example, an "alkyl group" formally can be derived by removing one hydrogen atom from an alkane, while an "alkylene group" formally can be derived by removing two hydrogen atoms from an alkane. Moreover, a more general term can be used to encompass a variety of groups that formally are derived by removing any number ("one or more") hydrogen atoms from a parent compound, which in this example can be described as an "alkane group," and which encompasses an "alkyl group," an "alkylene group," and materials having three or more hydrogen atoms, as necessary for the situation, removed from an alkane. The disclosure that a substituent, ligand, or other chemical moiety can constitute a particular "group" implies that the well-known rules of chemical structure and bonding are followed when that group is employed as described. When describing a group as being "derived by," "derived from," "formed by," or "formed from," such terms are used in a formal sense and are not intended to reflect any specific synthetic methods or procedures, unless specified otherwise or the context requires otherwise.

An aliphatic compound is an acyclic or cyclic, saturated or unsaturated compound, excluding aromatic compounds. An "aliphatic group" is a generalized group formed by removing one or more hydrogen atoms (as necessary for the particular group) from a carbon atom of an aliphatic compound. Aliphatic compounds, and therefore aliphatic groups, can contain organic functional group(s) and/or atom(s) other than carbon and hydrogen.

An aromatic compound is a compound containing a cyclically conjugated double bond system that follows the Hückel (4n+2) rule and contains (4n+2) pi-electrons, where n is an integer from 1 to 5. Aromatic compounds include "arenes" (hydrocarbon aromatic compounds) and "heteroarenes," also termed "hetarenes" (heteroaromatic compounds formally derived from arenes by replacement of one or more methine (—C=) carbon atoms of the cyclically conjugated double bond system with a trivalent or divalent heteroatoms, in such a way as to maintain the continuous pi-electron system characteristic of an aromatic system and a number of out-of-plane pi-electrons corresponding to the Hückel rule (4n+2)). While arctic compounds and heteroarene compounds are mutually exclusive members of the group of aromatic compounds, a compound that has both an arene group and a heteroarene group is generally considered a heteroarene compound. Aromatic compounds, arenes, and heteroarenes can be monocyclic benzene, toluene, furan, pyridine, methylpyridine) or polycyclic unless otherwise specified. Polycyclic aromatic compounds, arenes, and heteroarenes, include, unless otherwise specified, compounds wherein the aromatic rings can be fused (e.g., naphthalene, benzofuran, and indole), compounds where the aromatic groups can be separate and joined by a bond (e.g., biphenyl or 4-phenylpyridine), or compounds Where the aromatic groups are joined by a group containing linking atoms (e.g., carbon—the methylene group in diphenylmethane; oxygen—diphenyl ether; nitrogen—triphenyl amine; among others linking groups). As disclosed herein, the term "substituted" can be used to describe an aromatic group, arctic, or heteroarene wherein a non-hydrogen moiety formally replaces a hydrogen in the compound, and is intended to be non-limiting.

The term "olefin" as used herein refers to compound that has at least one carbon-carbon double bond that is not part of an aromatic ring or ring system. The term "olefin" includes aliphatic and aromatic, cyclic and acyclic, and/or linear and branched compounds having at least one carbon-carbon double bond that is not part of an aromatic ring or ring system, unless specifically stated otherwise. The term "olefin," by itself, does not indicate the presence or absence of halogen atoms and/or the presence or absence of other carbon-carbon double bonds unless explicitly indicated. The terms "hydrocarbon olefin" or "olefin hydrocarbon" refer to olefin compounds containing only hydrogen and carbon, e.g., no halogens are present. Heteroatoms such as oxygen, nitrogen, sulfur, phosphorus, and the like, are not present in the olefin. Olefins can also be further identified by the position of the carbon-carbon double bond. It is noted that alkenes, alkamonoenes, alkadienes, alkatrienes, cycloalkenes, cycloalkamonoenes, cycloalkadienes, are members of the class of olefins.

The term "alpha olefin" as used herein refers to an olefin that has a double bond between the first and second carbon atom of a contiguous chain of carbon atoms. The term "alpha olefin" includes linear and branched alpha olefins unless expressly stated otherwise. In the case of branched alpha olefins, a branch can be at the 2-position vinylidene) and/or the 3-position or higher with respect to the olefin double bond. The term "vinylidene" whenever used in this specification and claims refers to an alpha olefin having a branch at the 2-position with respect to the olefin double bond. By itself, the term "alpha olefin" does not indicate the presence or absence of halogens and/or the presence or absence of other carbon-carbon double bonds unless explicitly indicated. The terms "hydrocarbon alpha olefin" or "alpha olefin hydrocarbon" refer to alpha olefin compounds containing only hydrogen and carbon, e.g., no halogens are present. Heteroatoms such as oxygen, nitrogen, sulfur, phosphorus, and the like, are not present in the alpha olefin.

The term "linear alpha olefin" as used herein refers to a linear olefin having a double bond between the first and second carbon atoms. The term "linear alpha olefin" by itself does not indicate the presence or absence of halogens and/or the presence or absence of other carbon-carbon double bonds unless explicitly indicated. The terms "linear hydrocarbon alpha olefin" or "linear alpha olefin hydrocarbon" refers to linear alpha olefin compounds containing only hydrogen and carbon. Heteroatoms such as oxygen, nitrogen, sulfur, phosphorus, and the like, are not present in the linear alpha olefin.

The term "normal alpha olefin" as used herein refers to a linear hydrocarbon mono-olefin having a double bond between the first and second carbon atom. It should be noted that "normal alpha olefin" is not synonymous with "linear alpha olefin" as the term "linear alpha olefin" can include linear olefinic compounds having a double bond between the first and second carbon atoms and having halogens and/or additional double bonds.

The terms "oligomerization" and "oligomerizing" refer to processes which produce a mixture of products containing at least 70 weight percent products containing from 2 to 60 olefin monomer units (weight percent excluding residual olefin monomer). An "oligomer" is a molecule that contains from 2 to 60 olefin monomer units (per molecule) and encompasses, for example, dimer and trimer. An "oligomer product" includes all products made by the "oligomerization" process, including the "oligomers" and products which are not "oligomers" (e.g., products which contain more than 60 monomer units), and excludes non-oligomerized olefin monomer, catalyst, solvent (if any), etc. It should be noted that the monomer units in the "oligomer" or "oligomerization product" do not have to be the same. For example, these terms are also used generically herein to include olefin homo-oligomers, co-oligomers, and so forth, and thus encompass products derived from any number of different olefin monomers disclosed herein. In like manner, oligomerizing (or oligomerization) is meant to encompasses dimerizing (or dimerization), trimerizing (or trimerization), and so forth.

The term "contact product" is used herein to describe compositions wherein the components are contacted together in any order, in any manner, and for any length of time. For example, the components can be contacted by blending or mixing. Further, contacting of any component can occur in the presence or absence of any other component of the compositions and methods described herein. Combining additional materials or components can be done by any suitable method. Further, the term "contact product" includes mixtures, blends, solutions, slurries, reaction products, and the like, or combinations thereof. Although "contact product" can include reaction products, it is not required for the respective components to react with one another. Similarly, the term "contacting" is used herein to refer to materials which can be blended, mixed, slurried, dissolved, reacted, treated, or otherwise contacted in some other manner.

Although any methods and materials similar or equivalent to those described herein can be used in the practice or testing of the invention, the typical methods and materials are herein described.

All publications and patents mentioned herein are incorporated herein by reference. The publications and patents mentioned herein can be utilized for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

Applicants reserve the right to proviso out or exclude any individual members of any such group, including any sub-ranges or combinations of sub-ranges within the group, that can be claimed according to a range or in any similar manner, if for any reason Applicants choose to claim less than the full measure of the disclosure, for example, to account for a reference that Applicants can be unaware of at the time of the filing of the application. Further, Applicants reserve the right to proviso out or exclude any individual substituents, analogs, compounds, ligands, structures, or groups thereof, or any members of a claimed group, if for any reason Applicants choose to claim less than the full measure of the disclosure, for example, to account for a reference that Applicants can be unaware of at the time of the filing of the application.

DETAILED DESCRIPTION OF THE INVENTION

Disclosed herein are processes for oligomerizing olefins using a solid acid catalyst, and to the production of polyalphaolefins having reduced viscosities at low temperatures. Further disclosed herein are polyalphaolefins produced by any process described herein.

Oligomerization of Feedstock Olefins

Embodiments of this invention are directed to processes for forming an oligomer product. Such oligomerization processes can comprise (or consist essentially of, or consist of) contacting a feedstock olefin with a solid acid catalyst to form an oligomer product at an oligomerization temperature in a range from −20° C. to 40° C. In an embodiment, the feedstock olefin can comprise trisubstituted olefins. Generally, the features of the processes (e.g., the components and/or features of the feedstock olefin, the trisubstituted olefins (e.g., carbon number, olefin features), the solid acid catalyst, and the oligomerization temperature and other conditions under which the oligomer product is formed, among others) are independently described herein and these features can be combined in any combination to further describe the disclosed oligomerization processes.

In some embodiments, the feedstock olefin can comprise, consist essentially of, or consist of, $C_{12}$ to $C_{48}$ trisubstituted olefins. Moreover, the feedstock olefin can comprise, consist essentially of, or consist of, any single carbon number trisubstituted olefins from $C_{12}$ to $C_{48}$ (e.g., $C_{20}$ trisubstituted olefins) or any combination of different single carbon number trisubstituted olefins from $C_{12}$ to $C_{48}$ (e.g., $C_{16}$ to $C_{24}$ trisubstituted olefins; or $C_{20}$, $C_{24}$, and $C_{28}$ trisubstituted olefins, among other combinations). The feedstock olefin and trisubstituted olefins are described herein and their features can be utilized without limitation to further describe the feedstock olefin and trisubstituted olefins which can be utilized in the oligomerization processes. In some embodiments, an oligomerization process can utilize a single solid acid catalyst; or alternatively, the process can utilize more than one solid acid catalyst. Solid acid catalysts are described herein and these acid catalysts can be utilized without limitation in the oligomerization processes.

In some embodiments, the oligomerization process can include contacting the feedstock olefin, the solid acid catalyst, and optionally, additional unrecited materials (e.g., a non-olefin solvent or diluent, a stabilizer, amongst other materials). Thus, for example, the oligomer product can be formed in the presence of a non-olefin solvent. The amount of any non-olefin solvent used in addition to the disclosed trisubstituted olefins in the oligomerization process is not limited to any particular range. Such solvent, or combination of solvents, can be used, for example, as a flow modifier to alter the flow properties or viscosity of the feedstock olefin (or trisubstituted olefins) and/or the flow properties of the oligomer product. Non-olefin solvents which can be utilized are described herein, and these solvents can be utilized without limitation in the oligomerization processes described herein. In an embodiment, the oligomerization can be performed in the substantial absence of a solvent (e.g., less than 10, 5, 4, 3, 2, or 1 wt. % solvent, based upon the total weight of the feedstock olefin and the solvent).

The contacting of the feedstock olefin and solid acid catalyst and the resultant formation of the oligomer product can be conducted at an oligomerization temperature in a range from −20° C. to 40° C. Unexpectedly, a low oligomerization temperature was found to be beneficial for producing polyalphaolefins having low viscosities at sub-zero temperatures.

In an embodiment, the oligomerization temperature can be in a range from −10° C. to 40° C.; alternatively, from −20° C. to 35° C.; alternatively, from −10° C. to 35° C.; alternatively, from 0° C. to 40° C.; alternatively, from 0° C. to 35° C.; alternatively, from 0° C. to 30° C.; or alternatively, from 0° C. to 25° C. In other non-limiting embodiments, the oligomerization temperature can be in a range from 10° C. to 40° C., from 10° C. to 35° C., from 15° C. to 40° C., from 15° C. to 35° C., from 20° C. to 40° C., from 20° C. to 35° C., or from 20° C. to 30° C. Other temperature ranges for oligomerizing the feedstock olefin and forming the oligomer product are readily apparent from this disclosure. These temperature ranges also are meant to encompass circumstances where the oligomerization process is not conducted at a single fixed temperature, but rather, conducted at a series of different temperatures (where at least one temperature falls within the respective temperature ranges).

Generally, the oligomerization can be performed at any pressure. While not being limited thereto, the oligomerization process can be conducted at a reactor pressure in a range from 5 to 150 psig, or alternatively, from 10 to 100 psig. In some embodiments, the process can be conducted at atmospheric pressure, while in other embodiments, the process can be conducted at sub-atmospheric pressures.

In one embodiment, the weight ratio of the feedstock olefin (or the trisubstituted olefins) to the solid acid catalyst in the oligomerization process can be in a range from 1:1 to 100:1. In another embodiment, the weight ratio can be in a range from 2:1 to 75:1. In yet another embodiment, the weight ratio can be in a range from 5:1 to 40:1. In still another embodiment, the weight ratio can be in a range from 5:1 to 30:1.

Often, the process for forming an oligomer product can be a flow process and/or a continuous process. In such circumstances, the olefin-solid acid catalyst contact time (or reaction time) can be expressed in terms of weight hourly space velocity (WHSV)—the ratio of the weight of feedstock olefin (or the trisubstituted olefins) which comes in contact with a given weight of solid acid catalyst per unit time (units of g/g/hr). Generally, the oligomer product can be formed using any WHSV capable of forming the oligomer product at a desired set of oligomerization conditions and/or at a desired (weight or mole percent) conversion. While not limited thereto, the WHSV employed for the processes of producing an oligomer product as described herein can have a minimum value of 0.05, 0.1, 0.25, 0.5, 0.75, or 1; or alternatively, a maximum value of 5, 4, 3, 2.5, or 2. In an embodiment, the WHSV can be in a range from any minimum WHSV disclosed herein to any maximum WHSV disclosed herein. In a non-limiting example, the WHSV can be in a range from 0.05 to 5; alternatively, from 0.05 to 4; alternatively, from 0.1 to 5; alternatively, from 0.1 to 4; alternatively, from 0.1 to 3; alternatively, from 0.1 to 2;

alternatively, from 0.1 to 1; alternatively, from 0.1 to 0.8; alternatively, from 0.5 to 5; alternatively, from 0.5 to 4; alternatively, from 0.5 to 2.5; alternatively, from 0.8 to 3; or alternatively, from 1 to 3. Other WHSV ranges are readily apparent from this disclosure. Any suitable reactor or vessel can be used to form the oligomer product, non-limiting examples of which can include a flow reactor, a continuous reactor, a fixed bed reactor, and a stirred tank reactor, including more than one reactor in series or in parallel, and including any combination of reactor types and arrangements.

In an embodiment, the minimum feedstock olefin conversion (or minimum single pass conversion) can be at least 10%, by weight percent or by mole percent. The conversion of the feedstock olefin is described as "feedstock olefin conversion" to indicate that the percentage conversion, in weight percent or in mole percent, is based on the feedstock olefin and does not include non-olefin materials that can be present (e.g., solvent, etc.) during the oligomerization. In another embodiment, the minimum feedstock olefin conversion (or minimum single pass conversion) can be at least 15%, at least 20%, at least 25%, at least 30%, at least 40%, at least 50%, or at least 60%, and these percentages can be weight percentages or mole percentages. In yet another embodiment, the maximum conversion (or maximum single pass conversion) can be 99%, 95%, 90%, 85%, 80%, 75%, 70%, or 65%, and these percentages can be weight percentages or mole percentages. Generally, the feedstock olefin conversion can be in a range from any minimum conversion disclosed herein to any maximum conversion disclosed herein. Non-limiting ranges of feedstock olefin conversion (or single pass conversion), in weight or mole percentages, can include, but are not limited to, the following ranges: from 10% to 99%, from 20% to 990/%, from 25% to 95%, from 40% to 95%, from 25% to 90%, from 50% to 90%, from 60% to 90%, from 25% to 99%, from 50% to 99%, from 45% to 85%, from 50% to 85%, or from 50% to 80%. Other feedstock olefin conversion (or single pass olefin conversion) ranges are readily apparent from this disclosure. In some embodiments, these feedstock olefin conversions can be achieved in a batch process, while in other embodiments, these feedstock olefin conversions can be achieved in a flow or continuous process, such as, for example, a single pass thru a reactor (e.g., a fixed bed reactor).

In another embodiment, the minimum trisubstituted olefin conversion (or minimum single pass trisubstituted olefin conversion) can be at least 10%, by weight percent or by mole percent. In this regard, the conversion of the trisubstituted olefin is described as "trisubstituted olefin conversion" to indicate that the percentage conversion, in weight percent or in mole percent, is based on the trisubstituted olefins of the feedstock olefin, and does not include non-trisubstituted olefins that can be present (e.g., solvent, vinylidene olefin, etc.) during the oligomerization. In another embodiment, the minimum trisubstituted olefin conversion (or minimum single pass trisubstituted olefin conversion) can be at least 15%, at least 20%, at least 25%, at least 30%, at least 40%, at least 50%, or at least 60%, and these percentages can be weight percentages or mole percentages. In yet another embodiment, the maximum trisubstituted olefin conversion (or maximum single pass trisubstituted olefin conversion) can be 99%, 95%, 90%, 85%, 80%, 75%, 70%, or 65%, and these percentages can be weight percentages or mole percentages. Generally, the trisubstituted olefin conversion can be in a range from any minimum trisubstituted olefin conversion disclosed herein to any maximum trisubstituted olefin conversion disclosed herein. Non-limiting ranges of trisubstituted olefin conversion (or single pass trisubstituted olefin conversion), in weight or mole percentages, can include, but are not limited to, the following ranges: from 10% to 99%, from 20% to 99%, from 25% to 95%, from 40% to 95%, from 25% to 90%, from 50% to 90%, from 60% to 90%, from 25% to 99%, from 50% to 99%, from 45% to 85%, from 50% to 85%, or from 50% to 80%. Other trisubstituted olefin conversion (or single pass trisubstituted olefin conversion) ranges are readily apparent from this disclosure. In some embodiments, these trisubstituted olefin conversions can be achieved in a batch process, while in other embodiments, these trisubstituted olefin conversions can be achieved in a flow or continuous process, such as, for example, a single pass thru a reactor (e.g., a fixed bed reactor).

Feedstock Olefin Containing Trisubstituted Olefins

Embodiments of this invention are directed to processes comprising contacting a feedstock olefin comprising trisubstituted olefins with a solid acid catalyst at an oligomerization temperature in a range from −20° C. to 40° C. to form an oligomer product. A wide range of feedstock olefins comprising, consisting essentially of, or consisting of, trisubstituted olefins can be oligomerized according to the methods provided herein, and using the acid catalysts disclosed herein. In any embodiment wherein the feedstock olefin comprises trisubstituted olefins, the feedstock olefin can further comprise olefins other than trisubstituted olefins (e.g., non-trisubstituted olefins such as vinylidenes). Consequently, in some embodiments, the oligomerization processes disclosed herein can employ a feedstock olefin which is a mixture of trisubstituted olefins and non-trisubstituted olefins. In some embodiments, the feedstock olefin (trisubstituted olefins and non-trisubstituted olefins, if any) can comprise a hydrocarbon olefin (trisubstituted and non-trisubstituted, if any).

Generally, the feedstock olefin can comprise (or consist essentially of, or consist of) $C_{12}$ to $C_{48}$ olefins. In one embodiment, the feedstock olefin can comprise (or consist essentially of, or consist of) $C_{14}$ to $C_{40}$ olefins, while in another embodiment, the feedstock olefin can comprise (or consist essentially of, or consist of) $C_{16}$ to $C_{36}$ olefins, or $C_{16}$ to $C_{32}$ olefins. In yet another embodiment, the feedstock olefin can comprise $C_{16}$ to $C_{28}$ olefins. $C_{16}$ to $C_{24}$ olefins, $C_{16}$ to $C_{20}$ olefins, or $C_{20}$ to $C_{24}$ olefins. In other embodiments, the feedstock olefin can comprise (or consist essentially of, or consist of) $C_{12}$ olefins; alternatively, $C_{16}$ olefins; alternatively. $C_{20}$ olefins; alternatively, $C_{24}$ olefins; alternatively, $C_{28}$ olefins; alternatively, $C_{32}$ olefins; alternatively, $C_{36}$ olefins; or alternatively, $C_{40}$ olefins. Thus, mixtures of olefins having different numbers of carbon atoms can be used, or olefins having predominantly a single number of carbon atoms can be used as the feedstock olefin.

In an embodiment, the feedstock olefin can comprise a minimum of 10 wt. %, 25 wt. %, 50 wt. %, 75 wt. %, 80 wt. %, 85 wt. %, or 90 wt. % trisubstituted olefins of any feedstock olefin carbon number range described herein; or alternatively, a maximum of 100 wt. %, 99 wt. %, 95 wt. %, 90 wt. %, 85 wt. %, 80 wt. %, 75 wt. %, 70 wt. %, or 65 wt. % trisubstituted olefins of any feedstock olefin carbon number range described herein. Generally, the weight percent of trisubstituted olefin that can be present in the feedstock olefin can be in a range from any minimum trisubstituted olefin weight percent disclosed herein to any maximum weight percent disclosed herein. Non-limiting trisubstituted olefin weight percent ranges can include, but are not limited to, the following ranges: from 10 to 99 wt. %, from 25 to 99 wt. %, from 10 to 95 wt. %, from 50 to 95 wt.

%, from 25 to 90 wt. %, from 25 to 85 wt. %, or from 25 to 75 wt. %, trisubstituted olefins of any carbon number range described herein; alternatively, of any combination of single carbon numbered trisubstituted olefins described herein; or alternatively, of any single carbon numbered trisubstituted olefins described herein. Other trisubstituted olefin wt. % ranges are readily apparent from this disclosure. Moreover, in a particular embodiment contemplated herein, the feedstock olefin can comprise, consist essentially of, or consist of, hydrocarbon trisubstituted olefins.

In these and other embodiments, the trisubstituted olefins can be cyclic or acyclic. For example, the feedstock olefin can comprise, consist essentially of, or consist of, cyclic trisubstituted olefins; additionally or alternatively, the feedstock olefin can comprise, consist essentially of, or consist of, acyclic trisubstituted olefins (i.e., branched olefins). Moreover, the feedstock olefin can comprise olefins having only one olefin moiety (mono-olefins) and/or olefins having two olefin moieties (di-olefins), as well as compounds having more than two olefin moieties per molecule; alternatively, mono-olefins; alternatively, di-olefins; or alternatively, olefins having more than two olefin moieties per molecule.

Generally, the non-trisubstituted olefin that can be present in the feedstock olefin (if any) can be any olefin which does not adversely affect the process and/or adversely affect the properties of the product(s) produced (either the oligomer product or a PAO produced from the oligomer product). In an embodiment, the non-trisubstituted olefins that can be present in the feedstock olefin can include, either singly or in any combination, linear alpha olefin, normal alpha olefin, disubstituted olefin (linear and/or branched), vinylidene, or tetrasubstituted olefin. In some embodiments, the non-trisubstituted olefin present in the feedstock olefin can comprise, consist essentially of, or consist of, hydrocarbon olefins. Generally, the non-trisubstituted olefins that can be present in the feedstock olefin can have any carbon number, or carbon number range, as the olefins of the feedstock olefin described herein. In some embodiments, the feedstock olefin can comprise less than 15 wt. %, 10 wt. %, 7.5 wt. %, 5 wt. %, 2.5 wt. %, 2 wt. %, or 1 wt. %, linear alpha olefin (hydrocarbon or otherwise) based upon the weight of the feedstock olefin. In other embodiments, the feedstock olefin can comprise less than 15 wt. %, 10 wt. %, 7.5 wt. %, 5 wt. %, 2.5 wt. %, 2 wt. %, or 1 wt. %, normal alpha olefin based upon the weight of the feedstock olefin. In further embodiments, the feedstock olefin can comprise less than 25 wt. %, 20 wt. %, 15 wt. %, 10 wt. %, 7.5 wt. %, 5 wt. %, or 2.5 wt. %, disubstituted olefin (linear and/or branched, and/or hydrocarbon or otherwise) based upon the weight of the feedstock olefin. In an embodiment, the feedstock olefin can comprise less than 50 wt. %, 40 wt. %, 30 wt. %, 25 wt. %, 20 wt. %, 15 wt. %, 10 wt. %, 5 wt. %, or 2.5 wt. % vinylidene (hydrocarbon or otherwise) based upon the weight of the feedstock olefin. In yet a further embodiment, the feedstock olefin can comprise less than 50 wt. %, 40 wt. %, 30 wt. %, 25 wt. %, 20 wt. %, 15 wt. %, 10 wt. %, 5 wt. %, 2.5 wt. %, or 1 wt. % tetrasubstituted olefin (hydrocarbon or otherwise) based upon the weight of the feedstock olefin.

The feedstock olefin can comprise mixtures of trisubstituted olefins. Suitable trisubstituted olefins can, for example, have the double bond at any non-primary position. In some embodiments, the feedstock olefin can comprise, consist essentially of, or consist of, a mixture of trisubstituted olefins and vinylidene olefins.

Consistent with embodiments of this disclosure, the oligomerization process can be conducted in the presence of non-recited components or materials (other than the feedstock olefin and the solid acid catalyst), such as, for example, a non-olefin solvent. Accordingly, a non-olefin solvent, or other materials, can be present when the feedstock olefin and the solid acid catalyst are contacted at, for example, a solvent to feedstock olefin weight ratio of less than 10:1, less than 5:1, less than 3:1, less than 2:1, less than 1:1, less than 0.75:1, less than 0.5:1, less than 0.35:1, less than 0.25:1, less than 0.15:1, or less than 0.1:1.

Generally, the carbon number of the trisubstituted olefin, the types of trisubstituted olefins, and the weight percentage of trisubstituted olefins can be combined in any fashion to describe the trisubstituted olefins which can be utilized as the feedstock olefin. For example, in some non-limiting embodiments, the feedstock olefin can comprise (or consist essentially of, or consist of) a minimum of 10 wt. %, a minimum of 25 wt. %, a minimum of 50 wt. %, a minimum of 75 wt. %, from 10 to 99 wt. %, from 25 to 99 wt. %, from 10 to 95 wt. %, from 50 to 95 wt. %, from 20 to 90 wt. %, from 20 to 85 wt. %, or from 25 to 75 wt. %, $C_{12}$ to $C_{48}$ hydrocarbon trisubstituted olefins; alternatively, $C_{14}$ to $C_{40}$ hydrocarbon trisubstituted olefins; alternatively. $C_{16}$ to $C_{36}$ hydrocarbon trisubstituted olefins; alternatively. $C_{16}$ to $C_{32}$ hydrocarbon trisubstituted olefins; alternatively, $C_{16}$ to $C_{28}$ hydrocarbon trisubstituted olefins; alternatively, $C_{16}$ to $C_{24}$ hydrocarbon trisubstituted olefins; alternatively, $C_{16}$ to $C_{20}$ hydrocarbon trisubstituted olefins; alternatively, $C_{20}$ to $C_{24}$ hydrocarbon trisubstituted olefins; alternatively $C_{12}$ hydrocarbon trisubstituted olefins; alternatively, $C_{16}$ hydrocarbon trisubstituted olefins; alternatively, $C_{20}$ hydrocarbon trisubstituted olefins; alternatively, $C_{24}$ hydrocarbon trisubstituted olefins; alternatively, $C_{28}$ hydrocarbon trisubstituted olefins; alternatively. $C_{32}$ hydrocarbon trisubstituted olefins; alternatively, $C_{36}$ hydrocarbon trisubstituted olefins; or alternatively, $C_{40}$ hydrocarbon trisubstituted olefins. Other trisubstituted olefins (hydrocarbon or non-hydrocarbon) which can be utilized are readily apparent from the present disclosure. Additionally, the feedstock olefin can comprise olefins other than trisubstituted olefins as described herein.

In particular embodiments provided herein, the feedstock olefin can comprise (or consist essentially of, or consist of) a compound having the structure:

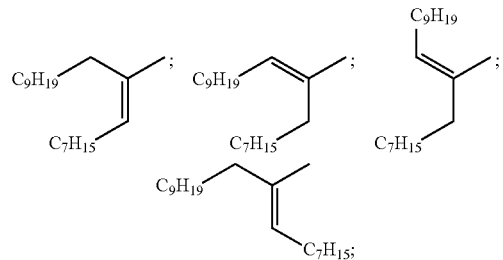

or any combination thereof. Accordingly, the feedstock olefin can contain any or all of these compounds, in any combination and at any relative amount. In one embodiment, for example, the feedstock olefin can contain all of these compounds. In another embodiment, the feedstock olefin contain can contain any one or any combination of these compounds and the vinylidene compound, 2-octyl-1-dodecene. The quantity of vinylidene compounds that can be present in the feedstock olefin is described herein and can be generally applied to the quantity of the vinylidene compound, 2-octyl-1-dodecene, that can be present in the feedstock olefin (e.g., the feedstock olefin can contain less than 25 wt. %, less than 20 wt. %, less than 15 wt. %, or less than 10 wt. %, of 2-octyl-1-dodecene, among other quantities of vinylidene disclosed herein).

In an embodiment, the feedstock olefin disclosed herein can be further characterized as being substantially free of oxygen-containing compounds. The term "substantially free" in this context means that less than 1000 ppm (by weight) of oxygen-containing compounds are present in the feedstock olefin prior to contacting the feedstock olefin with the solid acid catalyst. In another embodiment, the feedstock olefin can comprise less than 750 ppm; alternatively, less than 500 ppm; alternatively, less than 250 ppm; alternatively, less than 100 ppm; alternatively, less than 50 ppm; or alternatively, less than 10 ppm, of oxygen-containing compounds. Additionally, the quantities of oxygen-containing compounds disclosed herein for the feedstock olefin can be applied to any solvent or other material that can be optionally utilized in the oligomerization process. In some circumstances, such oxygen-containing compounds (e.g., molecular oxygen, water, peroxides, alcohols, ketones, etc.) can interact and/or bind with catalyst sites on the solid acid catalyst and adversely affect catalytic activity.

Likewise, in another embodiment, the feedstock olefin disclosed herein can be further characterized as being substantially free of nitrogen-containing compounds. The term "substantially free" in this context means that less than 1000 ppm (by weight) of nitrogen-containing compounds are present in the feedstock olefin prior to contacting the feedstock olefin with the solid acid catalyst. In another embodiment, the feedstock olefin can comprise less than 750 ppm; alternatively, less than 500 ppm; alternatively, less than 250 ppm; alternatively, less than 100 ppm; alternatively, less than 50 ppm; or alternatively, less than 10 ppm, of nitrogen-containing compounds. Additionally, the quantities of nitrogen-containing compounds disclosed herein for the feedstock olefin can be applied to any solvent or other material that can be optionally utilized in the oligomerization process. In some circumstances, such nitrogen-containing compounds (e.g., amines, ammonia, etc.) can interact and/or bind with catalyst sites on the solid acid catalyst and adversely affect catalytic activity. In this disclosure, the term "nitrogen-containing compounds" does not include molecular nitrogen ($N_2$), e.g., various processes disclosed herein can be conducted in an inert gas (e.g., $N_2$, argon, helium, etc.) atmosphere.

Feedstock Olefin Sources

There are many possible sources for the feedstock olefin (i.e., containing trisubstituted olefins) that can be employed in the processes described herein, as would be recognized by those of skill in the art. For instance, the feedstock olefin can be produced by a process comprising contacting a monomer comprising a $C_6$ to $C_{24}$ normal alpha olefin with a catalyst system comprising a metallocene compound, a chemically-treated solid oxide, and a co-catalyst, and oligomerizing the monomer comprising the normal alpha olefin. Generally, the features of the process for producing a feedstock olefin (e.g., the components and/or features of the monomer, the normal alpha olefin (e.g., carbon number), the metallocene compound, the chemically-treated solid oxide, the co-catalyst, the conditions under which the feedstock olefin is formed, among others) are independently described herein and these features can be combined in any combination to further describe the disclosed processes for producing a feedstock olefin.

Exemplary processes for oligomerizing a monomer comprising a normal alpha olefin with a catalyst system comprising a metallocene compound, a chemically-treated solid oxide, and a co-catalyst are described in U.S. Patent Publication No. 2010/0317904, the disclosure of which is incorporated herein by reference in its entirety. For example, the chemically-treated solid oxide can comprise a solid oxide treated with a electron withdrawing anion, and the solid oxide generally can comprise silica, alumina, silica-alumina, silica-coated alumina, aluminum phosphate, heteropolytungstate, titania, zirconia, magnesia, boria, or zinc oxide, as well as any mixed oxide thereof, or any mixture thereof. Although not limited thereto, the electron-withdrawing anion can comprise fluoride, chloride, bromide, phosphate, triflate, bisulfate, sulfate, fluorophosphate, fluorosulfate, or any combination thereof. In one embodiment, the chemically-treated solid oxide can comprise fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof. In another embodiment, the chemically-treated solid oxide can comprise fluorided alumina, sulfated alumina, fluorided silica-alumina, fluorided silica-coated alumina, or any combination thereof. In yet another embodiment, the chemically-treated solid oxide can comprise fluorided alumina; alternatively, sulfated alumina; alternatively, fluorided silica-alumina; or alternatively, fluorided silica-coated alumina. Combinations of two or more chemically-treated solid oxides also can be used.

Generally, the metallocene compound can be any metallocene compound which can be utilized in a catalyst system with a chemically-treated solid oxide and a co-catalyst to oligomerize a monomer comprising an alpha olefin to form a reaction product containing trisubstituted olefin. Representative and non-limiting examples of suitable bridged and unbridged metallocene compounds (e.g., containing zirconium, hafnium, or titanium) are disclosed in U.S. Patent Publication No. 2010/0317904, such as bis(cyclopentadienyl)hafnium dichloride, bis(cyclopentadienyl)zirconium dichloride, 1,2-ethanediylbis($\eta^5$-1-indenyl)di-n-butoxyhafnium, 1,2-ethanediylbis($\eta^5$-1-indenyl)dimethylzirconium, 3,3-pentanediylbis($\eta^5$-4,5,6,7-tetrahydro-1-indenyl)hafnium dichloride, methylphenylsilylbis($\eta^5$-4,5,6,7-tetrahydro-1-indenyl)zirconium dichloride, bis(n-butylcyclopentadienyl)di-t-butylamido hafnium, bis(n-butylcyclopentadienyl) zirconium dichloride, bis(n-butylcyclopentadienyl) hafnium dichloride, bis (ethylcyclopentadienyl) zirconium dichloride, bis (propylcyclopentadienyl) zirconium dichloride, dimethylsilylbis(1-indenyl) zirconium dichloride, nonyl (phenyl)silylbis(1-indenyl) hafnium dichloride, dimethylsilylbis($\eta^5$-4,5,6,7-tetrahydro-1-indenyl)zirconium dichloride, dimethylsilylbis(2-methyl-1-indenyl)zirconium dichloride, 1,2-ethanediylbis(9-fluorenyl)zirconium dichloride, indenyl diethoxy titanium(IV) chloride, (isopropylamidodimethylsilyl)cyclopentadienyltitanium dichloride, bis (pentamethylcyclopentadienyl) zirconium dichloride, bis (pentamethylcyclopentadienyl) hafnium dichloride, bis (indenyl)zirconium dichloride, methyloctylsilyl bis(9-fluorenyl) zirconium dichloride, bis(cyclopentadienyl) hafnium dimethyl, bis(cyclopentadienyl)zirconium dibenzyl, 1,2-ethanediylbis($\eta^5$-1-indenyl) dimethylhafnium, 1,2-ethanediylbis($\eta^5$-1-indenyl dimethylzirconium, 3,3-pentanediylbis($\eta^5$-4,5,6,7-tetrahydro-1-indenyl)hafnium dimethyl, methylphenylsilylbis($\eta^5$-4,5,6,7-tetrahydro-1-indenyl)zirconium dimethyl, bis(1-n-butyl-3-methyl-cyclopentadienyl)zirconium dimethyl, bis(n-butylcyclopentadienyl)zirconium dimethyl, dimethylsilylbis(1-indenyl) zirconium bis(trimethylsilylmethyl), octyl(phenyl)silylbis (1-indenyl)hafnium dimethyl, dimethylsilylbis($\eta^5$-4,5,6,7-tetrahydro-1-indenyl)zirconium dimethyl, dimethylsilylbis (2-methyl-1-indenyl)zirconium dibenzyl, 1,2-ethanediylbis (9-fluorenyl)zirconium dimethyl, (indenyl)trisbenzyl titanium(IV), (isopropylamidodimethylsilyl)cyclopentadienyltitanium dibenzyl, bis(pentamethylcyclopentadienyl) zirconium dimethyl, bis(indenyl) zirconium dimethyl, methyl(octyl)silylbis(9-fluorenyl)zirconium dimethyl, bis(2, 7-di-tert-butylfluorenyl)-ethan-1,2-diyl)zirconium(IV) dimethyl, 2-($\eta^5$-cyclopentadienyl)-2-($\eta^5$-fluoren-9-yl)hex-5-ene zirconium(IV) dichloride, 2-($\eta^5$-cyclopentadienyl)-2-($\eta^5$-2,7-di-tert-butylfluoren-9-yl)hex-5-ene zirconium(IV) dichloride, 2-($\eta^5$-cyclopentadienyl)-2-($\eta^5$-fluoren-9-yl) hept-6-ene zirconium(IV) dichloride, 2-($\eta^5$-cyclopentadienyl)-2-($\eta^5$-2,7-di-tert-butylfluoren-9-yl)hept-6-ene zirconium(IV) dichloride, 1-($\eta^5$-cyclopentadienyl)-1-($\eta^5$-fluoren-9-yl)-1-phenylpent-4-ene zirconium(IV) dichloride, 1-($\eta^5$-cyclopentadienyl)-1-($\eta^5$-2,7-di-tert-butyl fluoren-9-yl)-1-phenylpent-4-ene zirconium(IV) dichloride, 1-($\eta^5$-cyclopentadienyl)-1-($\eta^5$-fluoren-9-yl)-1-phenylhex-5-ene zirconium(IV) dichloride, and 1-($\eta^5$-cyclopentadienyl)-1-($\eta^5$-2,7-di-tert-butylfluoren-9-yl)-1-phenylhex-5-ene zirconium(IV) dichloride. One or more than one metallocene compound can be used in the production of a feedstock olefin from a monomer comprising a normal alpha olefin. In the catalyst system, the weight ratio of the chemically-treated solid oxide to the metallocene compound can be in a range from 1:1 to 100,000:1; alternatively, from 10:1 to 10,000:1; alternatively, from 50:1 to 1,000:1; or alternatively, from 100:1 to 50:1.

Suitable co-catalysts which can be used singly or in any combination also are described in U.S. Patent Publication No. 2010/0317904, including but not limited to, organoaluminum compounds, organozinc compounds, organomagnesium compounds, and organolithium compounds, as well as combinations thereof. In particular embodiments disclosed herein, the co-catalyst can comprise trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, as well as combinations thereof. In any embodiment disclosed herein in which the catalyst system utilizes an organoaluminum compound, the molar ratio of aluminum of the organoaluminum compound to the transition metal of the metallocene compound can be in a range from 1:1 to 10,000:1; alternatively, from 10:1 to 1,000:1; alternatively, from 5:1 to 250:1; or alternatively, from 10:1 to 100:1.

Exemplary organozinc compounds which can be used as co-catalysts can include, but are not limited to, dimethylzinc, diethylzinc, dipropylzinc, dibutylzinc, dineopentylzinc, di(trimethylsilyl)zinc, di(triethylsilyl)zinc, di(triisoproplysilyl)zinc, di(triphenylsilyl)zinc, di(allyldimethylsilyl)zinc, di(trimethylsilylmethyl)zinc, or combinations thereof. Similarly, exemplary organomagnesium compounds can include, but are not limited to, dimethylmagnesium, diethylmagnesium, dipropylmagnesium, dibutylmagnesium, dineopentylmagnesium, di(trimethylsilylmethyl)magnesium, methylmagnesium chloride, ethylmagnesium chloride, propylmagnesium chloride, butylmagnesium chloride, neopentylmagnesium chloride, trimethylsilylmethylmagnesium chloride, methylmagnesium bromide, ethylmagnesium bromide, propylmagnesium bromide, butylmagnesium bromide, neopentylmagnesium bromide, trimethylsilylmethylmagnesium bromide, methylmagnesium iodide, ethylmagnesium iodide, propylmagnesium iodide, butylmagnesium iodide, neopentylmagnesium iodide, trimethylsilylmethylmagnesium iodide, methylmagnesium ethoxide, ethylmagnesium ethoxide, propylmagnesium ethoxide, butylmagnesium ethoxide, neopentylmagnesium ethoxide, trimethylsilylmethylmagnesium ethoxide, methylmagnesium propoxide, ethylmagnesium propoxide, propylmagnesium propoxide, butylmagnesium propoxide, neopentylmagnesium propoxide, trimethylsilylmethylmagnesium propoxide, methylmagnesium phenoxide, ethylmagnesium phenoxide, propylmagnesium phenoxide, butylmagnesium phenoxide, neopentylmagnesium phenoxide, trimethylsilylmethylmagnesium phenoxide, or any combinations thereof. Likewise, exemplary organolithium compounds can include, but are not limited to, methyllithium, ethyllithium, propyllithium, butyllithium (e.g., t-butyllithium), neopentyllithium, trimethylsilylmethyllithium, phenyllithium, tolyllithium, xylyllithium, benzyllithium, (dimethylphenyl) methyllithium, allyllithium, or combinations thereof.

In a non-limiting embodiment, the monomer can comprise (or consist essentially of, or consist of) a $C_6$ to $C_{24}$ normal alpha olefin, and more often, a $C_8$ to $C_{20}$ normal alpha olefin. In one embodiment, the monomer can comprise a $C_5$ to $C_{18}$ normal alpha olefin, while in another embodiment, the monomer can comprise a $C_6$ to $C_{16}$ normal alpha olefin, or a $C_8$ to $C_{14}$ normal alpha olefin. In yet another embodiment, the monomer can comprise a $C_8$ to $C_{12}$ normal alpha olefin. In other embodiments, the monomer can comprise (or consist essentially of, or consist of) 1-hexene, 1-octene, 1-decene, 1-dodecene, 1-tetradecene, 1-hexadecene, 1-octadecene, or any combination thereof; alternatively, 1-hexene; alternatively, 1-octene; alternatively, 1-decene; alternatively, 1-dodecene; alternatively, 1-tetradecene; alternatively, 1-hexadecene; or alternatively, 1-octadecene. Thus, mixtures of various normal alpha olefins having different numbers of carbon atoms can be used, or normal alpha olefins having predominantly a single number of carbon atoms can be used. The monomer comprising normal alpha olefins can, in some embodiments, comprise at least 50 wt. %, at least 60 wt. %, at least 70 wt. %, at least 75 wt. %, at least 80 wt. %, at least 85 wt. %, at least 90 wt. %, at least 92.5 wt. %, or at least 95 wt. %, of any carbon number range of normal alpha olefins described herein; alternatively, of any combination of single carbon numbered normal alpha olefins described herein; or alternatively, of any single carbon numbered normal alpha olefin described herein.

Suitable conditions for producing the feedstock olefin by contacting a monomer comprising a $C_6$ to $C_{24}$ normal alpha olefin with a catalyst system comprising a metallocene compound, a chemically-treated solid oxide, and a co-catalyst, are disclosed in U.S. Patent Publication No. 2010/0317904. While not being limited thereto, the monomer and the catalyst system can be contacted at a reaction temperature in a range from 60° C. to 140° C. from 70° C. to 130° C., or from 80° C. to 120° C. The monomer and the catalyst system can be contacted by combining, in any order, the monomer, the metallocene compound, the chemically-treated solid oxide, and the co-catalyst. Often, the weight ratio of the monomer (or the normal alpha olefin) to the metallocene compound can be in a range, for example, from 10,000:1 to 350,000:1, from 12,000:1 to 320,000:1, from 15,000:1 to 250,000:1, or from 25,000:1 to 200,000:1.

In an embodiment, the conversion of the normal alpha olefin to trisubstituted olefins of the feedstock olefin can be a minimum of 1%, 2%, 3%, 5%, 10%, 15%, 20%, 25%, 30%

40%, or 50% based upon the weight or moles of the normal alpha olefin; or alternatively, a maximum of 95%, 90%, 85%, 75%, 60%, 50%, 40%, 30%, 25%, 20%, 15%, or 10% based upon the weight or moles of the normal alpha olefin. The conversion of the normal alpha olefin to trisubstituted olefins of the feedstock olefin can range from any minimum conversion described herein to any maximum described herein. Exemplary conversion ranges include the following non-limited ranges of weight percentages (or alternatively, in mole percentages): from 2% to 95%, from 2% to 75%, from 2% to 50%, from 2% to 25%, from 2% to 15%, from 2% to 10%, from 5% to 95%, from 5% to 90%, from 5% to 75%, from 5% to 50%, from 10% to 90%, from 10% to 75%, from 25% to 75%, from 25% to 50%, from 50% to 95%, or from 50% to 75%. Other conversion ranges are readily apparent from this disclosure. In another embodiment, the feedstock olefin can be produced by a process comprising (i) contacting a monomer comprising a $C_6$ to $C_{24}$ normal alpha olefin (e.g., 1-decene) with a catalyst system comprising any metallocene compound, any chemically-treated solid oxide, and any co-catalyst disclosed herein to produce a reaction product comprising monomer, dimer comprising trisubstituted olefins, and higher oligomers, and (ii) removing at least a portion of the monomer and/or at least a portion of the higher oligomers from the reaction product to produce the feedstock olefin (i.e., containing trisubstituted olefins). In an embodiment, the feedstock olefin can comprise less than 15 wt. %, 10 wt. %, 7.5 wt. %, 5 wt. %, 2.5 wt. %, 1 wt. %, 0.5 wt. %, 0.25 wt. %, or 0.1 wt. % monomer. In another embodiment, the feedstock olefin can comprise less than 15 wt. %, 10 wt. %, 7.5 wt. %, 5 wt. %, 2.5 wt. %, 1 wt. %, 0.5 wt. %, 0.25 wt. %, or 0.1 wt. % higher oligomers. In some embodiments, the feedstock olefin can contain any amount of monomer disclosed herein and/or any amount of higher oligomers disclosed herein. The removing step can be performed using a variety of techniques known to those of skill in art, non-limiting examples of which include wiped film evaporation, distillation, short path distillation, filtration, etc., and this includes combinations of two or more of these techniques.

In some embodiments, the feedstock olefin can be produced by a process comprising isomerizing a vinylidene composition comprising any $C_{12}$ to $C_{48}$ vinylidene disclosed herein. Methods of isomerizing vinylidene to trisubstituted olefin are well known to those of skill in the art. Many acids (organic or inorganic) can be utilized or, alternatively, acidic or slightly acidic materials, such as zeolites, molecular sieves, acidic ion exchange resins, clays (acidic and/or acid washed), aluminas (e.g., acidic and/or acid washed), and/or silicas (acidic and/or acid washed), can be used. In some instances, the isomerization of the vinylidene can be performed selectively in the presence of an alpha olefin with little to no isomerization of the alpha olefin. Due to the mildness of the selective isomerization, the method utilized to selectively isomerize vinylidene to trisubstituted olefin can be utilized to perform the vinylidene isomerization whether or not other olefins are present. However, in the context of the present disclosure, the isomerization of the vinylidene is not limited to these selective vinylidene isomerization methods. Representative vinylidene isomerizations are described in U.S. Pat. Nos. 3,940,452, 4,697,040, 6,407,302, 6,639,118, and 7,078.579. Other methods and processes for isomerizing vinylidenes can be readily found by those of ordinary skill in the art. Moreover, as would be recognized by those of skill in the art, the vinylidene composition can be produced using a variety of dimerization processes. In one embodiment, the vinylidene composition can be produced by a process comprising contacting a monomer comprising a $C_6$ to $C_{24}$ normal alpha olefin (e.g., any $C_6$ to $C_{24}$ normal alpha olefin disclosed herein) with a catalyst system to form the vinylidene composition. In some embodiments, the catalyst system can comprise, consist essentially of, or consist of, an alkylaluminum compound. The alkylaluminum compound can be any alkyl aluminum compound disclosed herein or in U.S. Patent Publication No. 2010/0317904. In a further aspect, the vinylidene composition can be produced by a process comprising (i) contacting a monomer comprising any $C_6$ to $C_{24}$ normal alpha olefin disclosed herein with any alkylaluminum compound disclosed herein to produce a reaction product comprising monomer, dimer, and optionally higher oligomers (if any), and (ii) removing at least a portion of the monomer and/or at least a portion of the higher oligomers from the reaction product to produce the vinylidene composition (i.e., containing vinylidenes). In an embodiment, the vinylidene composition can comprise less than 15 wt. %, 10 wt. %, 7.5 wt. %, 5 wt. %, 2.5 wt. %, 1 wt. %, 0.5 wt. %, 0.25 wt. %, or 0.1 wt. % monomer. In another embodiment, the vinylidene composition can comprise less than 15 wt. %, 10 wt. %, 7.5 wt. %, 5 wt. %, 2.5 wt. %, 1 wt. %, 0.5 wt. %, 0.25 wt. %, or 0.1 wt. % higher oligomers. In some embodiments, the vinylidene composition can contain any amount of monomer disclosed herein and/or any amount of higher oligomers disclosed herein. The removing step can be performed using a variety of techniques known to those of skill in art, non-limiting examples of which include wiped film evaporation, distillation, short path distillation, filtration, etc., and this includes combinations of two or more of these techniques. Processes for producing vinylidenes as described are demonstrated in, for example, U.S. Pat. No. 4,973,788.

In another embodiment, the vinylidene composition can produced by a process comprising contacting a monomer comprising a $C_6$ to $C_{24}$ normal alpha olefin (e.g., any $C_6$ to $C_{24}$ normal alpha olefin disclosed herein) with a catalyst system comprising a metallocene compound and an aluminoxane. Suitable metallocene compounds and aluminoxanes are disclosed herein and in U.S. Patent Publication No. 2010/0317904. Additionally, suitable metallocenes which can be utilized are disclosed in U.S. Patent Publication No. 2008/0146469, and U.S. Pat. Nos. 6,548,723, 7,989,670, and 8,207,390, and illustrative examples, but not an exhaustive list, of publications showing the oligomerization of a normal alpha olefin to produce a reaction product containing dimers comprising vinylidene using a catalyst system containing an aluminoxane are described in U.S. Patent Publication No. 2008/0146469 and U.S. Pat. No. 6,548,723. Further, U.S. Pat. Nos. 4,658,078 and 5,087,788 provide illustrative examples of producing a product having significant quantities of dimer comprising vinylidene. Other methods and processes for oligomerizing olefins in the presence of a metallocene and an aluminoxane to produce a reaction product comprising a dimer comprising vinylidene can be readily found by those of ordinary skill in the art. In a further aspect, the vinylidene composition can be produced by a process comprising (i) contacting a monomer comprising any $C_6$ to $C_{24}$ normal alpha olefin with a catalyst system comprising any metallocene compound and any aluminoxane disclosed herein to produce a reaction product comprising monomer, dimer, and higher oligomers, and (ii) removing at least a portion of the monomer and/or at least a portion of the higher oligomers from the reaction product to produce the vinylidene composition (i.e., containing vinylidenes). As described herein, the removing step can be performed using a variety of techniques, such as wiped film evaporation, distillation, short path distillation, filtration, etc., as well as combinations of two or more of these techniques.

In yet another embodiment, the vinylidene composition can be produced by a process comprising contacting a monomer comprising a $C_6$ to $C_{24}$ normal alpha olefin (e.g., any $C_6$ to $C_{24}$ normal alpha olefin disclosed herein) with a catalyst system comprising a metallocene compound, a non-coordinating anion activator, and an alkylaluminum compound. Suitable metallocene compounds and alkylaluminum compounds are disclosed herein and in U.S. Patent Publication No. 2010/0317904, and suitable non-coordinating anion activators are disclosed in U.S. Patent Publication No. 2010/0317904. Representative examples of dimerization using a catalyst system containing a non-coordinating anion activator are described in U.S. Pat. Nos. 7,989,670 and 8,207,390. Other methods and processes for oligomerizing olefins using a catalyst system containing a non-coordinating anion activator to produce a reaction product comprising a dimer comprising vinylidene can be readily found by those of ordinary skill in the art. In a further aspect, the vinylidene composition can be produced by a process comprising (i) contacting a monomer comprising any $C_6$ to $C_{24}$ normal alpha olefin disclosed herein with a catalyst system any metallocene compound, any non-coordinating anion activator, and any alkylaluminum compound disclosed herein to produce a reaction product comprising monomer, dimer, and higher oligomers, and (ii) removing at least a portion of the monomer and/or at least a portion of the higher oligomers from the reaction product to produce the vinylidene composition (i.e., containing vinylidenes). As described herein, the removing step can be performed using, for example, wiped film evaporation, distillation, short path distillation, filtration, etc., as well as combinations thereof.

Solid Acid Catalysts

In some embodiments, the catalyst employed in the oligomerization of a feedstock olefin comprising trisubstituted olefins, for example, $C_{12}$ to $C_{48}$ trisubstituted olefins, can be a solid acid catalyst. A single type of solid acid catalyst can be employed, or the oligomerization process can employ more than one type of solid acid catalyst.

In one embodiment, the solid acid catalyst can comprise (or consist essentially of, or consist of) an acidic ion exchange resin. In another embodiment, the solid acid catalyst can comprise (or consist essentially of, or consist of) a styrene-divinylbenzene polymer resin, a functionalized styrene-divinylbenzene polymer resin, a functionalized polymer resin comprising units derived from styrene and units derived from divinyl benzene, a 4-vinylpyridine divinylbenzene polymer resin, an ionomer resin, a tetrafluoroethylene polymer resin modified with perfluorovinyl ether groups terminated with sulfonate groups, or any combination thereof; or alternatively, a styrene-divinylbenzene polymer resin, a functionalized styrene-divinylbenzene polymer resin, a functionalized polymer resin comprising units derived from styrene and units derived from divinyl benzene, or any combination thereof. In yet another embodiment, the solid acid catalyst can comprise (or consist essentially of, or consist of) a styrene-divinylbenzene polymer resin; alternatively, a functionalized styrene-divinylbenzene polymer resin; alternatively, a functionalized polymer resin comprising units derived from styrene and units derived from divinyl benzene; alternatively, a 4-vinylpyridine divinylbenzene polymer resin; alternatively, an ionomer resin; or alternatively, a tetrafluoroethylene polymer resin modified with perfluorovinyl ether groups terminated with sulfonate groups.

Commercially available acidic resins that can be employed as the solid acid catalyst in embodiments disclosed herein can include AMBERLYST® resins, NAFION® resins, or any combination thereof. Thus, for example, the solid acid catalyst can comprise an AMBERLYST® resin; or alternatively, a NAFION® resin. Various grades of the AMBERLYST® resin and/or the NAFION® resin can be used as the solid acid catalyst. While not limited thereto, the solid acid catalyst can comprise (or consist essentially of, or consist of) AMBERLYST® 15 resin, AMBERLYST® 31 resin, AMBERLYST® 35 resin. AMBERLYST® 36 resin, AMBERLYST® DT resin, or any combination thereof; alternatively, AMBERLYST® 15 resin; alternatively, AMBERLYST® 31 resin; alternatively, AMBERLYST® 35 resin; alternatively, AMBERLYST® 36 resin; or alternatively, AMBERLYST® DT resin. In other embodiments, the solid acid catalyst can comprise (or consist essentially of, or consist of) Nafion® NR50, Nafion® SAC-13, or Nafion® trimethylsilylated; alternatively, Nafion® NR50; alternatively, Nafion® SAC-13; or alternatively, Nafion® trimethylsilylated.

The solid acid catalyst can be modified or functionalized with an organic acid and/or an inorganic acid; alternatively, an organic acid; or alternatively, an inorganic acid. In some embodiments, the solid acid catalyst can be modified with a carboxylic acid, a sulfonic acid, or any combination thereof; alternatively, a carboxylic acid; or alternatively, a sulfonic acid. In an embodiment, the carboxylic acid can be a $C_1$ to $C_{20}$ carboxylic acid; alternatively, a $C_1$ to $C_{15}$ carboxylic acid; or alternatively, a $C_1$ to $C_{10}$ carboxylic acid. In an embodiment, the sulfonic acid can be a $C_1$ to $C_{20}$ sulfonic acid; alternatively, a $C_1$ to $C_{15}$ sulfonic acid; or alternatively, a $C_1$ to $C_{10}$ sulfonic acid. In a non-limiting embodiment, the acid which can be utilized to modify the solid acid catalyst can comprise, consist essentially of, or consist of, benzoic acid, formic acid, acetic acid, propionic acid, butyric acid, oxalic acid, trifluoroacetic acid, trichloroacetic acid, sulfamic acid, benzene sulfonic acid, toluene sulfonic acid (ortho, meta, and/or para), dodecylbenzene sulfonic acid, naphthalene sulfonic acid, dinonylnaphthalene disulfonic acid, methane sulfonic acid, or any combination thereof; alternatively, benzoic acid, formic acid, acetic acid, propionic acid, butyric acid, oxalic acid, trifluoroacetic acid, trichloroacetic acid, or any combination thereof; or alternatively, benzene sulfonic acid, toluene sulfonic acid (ortho, meta, and/or para), dodecylbenzene sulfonic acid, naphthalene sulfonic acid, dinonylnaphthalene disulfonic acid, methane sulfonic acid, or any combination thereof. In a non-limiting embodiment, the solid acid catalyst can be modified or functionalized with an acid comprising, consisting essentially of, or consisting of, benzoic acid; alternatively, formic acid; alternatively, acetic acid; alternatively, propionic acid; alternatively, butyric acid; alternatively, oxalic acid; alternatively, trifluoroacetic acid; alternatively, trichloroacetic acid; alternatively, sulfamic acid; alternatively, benzene sulfonic acid; alternatively, toluene sulfonic acid; alternatively, dodecylbenzene sulfonic acid; alternatively, naphthalene sulfonic acid; alternatively, dinonylnaphthalene disulfonic acid; or alternatively, methane sulfonic acid.

Non-Olefin Solvents

Illustrative non-olefin organic solvents which can be utilized in the processes disclosed herein can include hydrocarbons, halogenated hydrocarbons, and combinations thereof. Hydrocarbon and halogenated hydrocarbon solvents can include, for example, aliphatic hydrocarbons, aromatic hydrocarbons, petroleum distillates, halogenated aliphatic hydrocarbons, halogenated aromatic hydrocarbons, or combinations thereof; alternatively, aliphatic hydrocarbons, aromatic hydrocarbons, halogenated aliphatic hydrocarbons, halogenated aromatic hydrocarbons, and combinations thereof; alternatively, aliphatic hydrocarbons; alternatively, aromatic hydrocarbons; alternatively, halogenated aliphatic hydrocarbons; or alternatively, halogenated aromatic hydrocarbons. Generally, suitable solvents include solvents that do not react with the monomers, normal alpha olefins, feedstock olefins, trisubstituted olefins, solid acid catalysts, etc., disclosed herein.

Aliphatic hydrocarbons which can be useful as an oligomerization solvent include $C_3$ to $C_{20}$ aliphatic hydrocarbons; alternatively $C_4$ to $C_{15}$ aliphatic hydrocarbons; or alternatively, $C_5$ to $C_{10}$ aliphatic hydrocarbons. The aliphatic hydrocarbons can be cyclic or acyclic and/or can be linear or branched, unless otherwise specified.

Non-limiting examples of suitable acyclic aliphatic hydrocarbon solvents that can be utilized singly or in any combination include pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof; alternatively, pentane (n-pentane or a mixture of linear and branched $C_5$ acyclic aliphatic hydrocarbons), hexane (n-hexane or mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof; hexane (n-hexane or a mixture of linear and branched $C_6$ acyclic aliphatic hydrocarbons), heptane (n-heptane or mixture of linear and branched $C_7$ acyclic aliphatic hydrocarbons), octane (n-octane or a mixture of linear and branched $C_8$ acyclic aliphatic hydrocarbons), and combinations thereof; alternatively, pentane (n-pentane or a mixture of linear and branched $C_5$ acyclic aliphatic hydrocarbons); alternatively, hexane (n-hexane or mixture of linear and branched $C_6$ acyclic aliphatic hydrocarbons); alternatively, heptane (n-heptane or mixture of linear and branched $C_7$ acyclic aliphatic hydrocarbons); or alternatively, octane (n-octane or a mixture of linear and branched $C_8$ acyclic aliphatic hydrocarbons).

Non-limiting examples of suitable cyclic aliphatic hydrocarbon solvents include cyclohexane, methyl cyclohexane, and combinations thereof; alternatively cyclohexane; or alternatively, methylcyclohexane.

Aromatic hydrocarbons which can be useful as a solvent include $C_6$ to $C_{20}$ aromatic hydrocarbons; alternatively, $C_6$ to $C_{20}$ aromatic hydrocarbons; or alternatively, $C_6$ to $C_{10}$ aromatic hydrocarbons. Non-limiting examples of suitable aromatic hydrocarbons that can be utilized singly or in any combination include benzene, toluene, xylene (including ortho-xylene, meta-xylene, para-xylene, or mixtures thereof), and ethylbenzene, or combinations thereof; alternatively, benzene; alternatively, toluene; alternatively, xylene (including ortho-xylene, meta-xylene, para-xylene or mixtures thereof); or alternatively, ethylbenzene.

Halogenated aliphatic hydrocarbons which can be useful as a solvent include $C_2$ to $C_{15}$ halogenated aliphatic hydrocarbons; alternatively, $C_2$ to $C_{10}$ halogenated aliphatic hydrocarbons; or alternatively. $C_2$ to $C_5$ halogenated aliphatic hydrocarbons. The halogenated aliphatic hydrocarbons can be cyclic or acyclic and/or can be linear or branched, unless otherwise specified. Non-limiting examples of suitable halogenated aliphatic hydrocarbons which can be utilized include chloroform, carbon tetrachloride, dichloroethane, trichloroethane, and combinations thereof; alternatively, chloroform, dichloroethane, trichloroethane, and combinations thereof; alternatively, methylene chloride; alternatively, chloroform; alternatively, carbon tetrachloride; alternatively, dichloroethane; or alternatively, trichloroethane.

Halogenated aromatic hydrocarbons which can be useful as a solvent include $C_6$ to $C_{20}$ halogenated aromatic hydrocarbons; alternatively, $C_6$ to $C_{15}$ halogenated aromatic hydrocarbons; or alternatively, $C_6$ to $C_{10}$ halogenated aromatic hydrocarbons. Non-limiting examples of suitable halogenated aromatic hydrocarbons include chlorobenzene, dichlorobenzene, and combinations thereof; alternatively, chlorobenzene; or alternatively, dichlorobenzene.

It should be noted that while most of the disclosed solvents can have olefinic members, it is the non-olefinic members which can be utilized in accordance with certain aspects and embodiments of the processes disclosed herein.

Oligomer Products and Polyalphaolefins

Embodiments of the present invention can be directed to oligomer products produced from a feedstock olefin comprising trisubstituted olefins (for example, a feedstock olefin comprising $C_{20}$ hydrocarbon trisubstituted olefins, among others described herein). In an embodiment, the present invention can encompass an oligomer product produced by any process disclosed herein. In another embodiment, the present invention can encompass a polyalphaolefin produced by any process disclosed herein. It is contemplated that the oligomerization processes disclosed herein, i.e., including a step of contacting the feedstock olefin with a solid acid catalyst at an oligomerization temperature in a range from −20° C. to 40° C., can have excellent conversion to dimers, as compared to the conversion at higher oligomerization temperatures. In an embodiment, the oligomer product can contain a minimum amount of feedstock olefin dimer (or trisubstituted olefin dimer) of at least 10 wt. %. In another embodiment, the oligomer product can contain a minimum amount of feedstock olefin dimer (or trisubstituted olefin dimer) of at least 15 wt. %, at least 20 wt. %, at least 25 wt. %, at least 30 wt. %, at least 40 wt. %, at least 50 wt. %, at least 60 wt. %, at least 70 wt. %, at least 80 wt. %, or at least 85 wt. %. In yet another embodiment, the maximum amount of feedstock olefin dimer (or trisubstituted olefin dimer) can be 99 wt. %, 95 wt. %, 90 wt. %, 85 wt. %, 80 wt. %, 75 wt. %, 70 wt. %, or 65 wt. %. Generally, the oligomer product can contain an amount of feedstock olefin dimer (or trisubstituted olefin dimer) in a range from any minimum amount disclosed herein to any maximum amount disclosed herein. Accordingly, non-limiting ranges can include, but are not limited to, the following ranges: from 10 to 99 wt. %, from 20 to 99 wt. %, from 25 to 95 wt. %, from 40 to 95 wt. %, from 30 to 90 wt. %, from 50 to 90 wt. %, from 60 to 90 wt. %, from 25 to 99 wt. %, from 50 to 99 wt. %, from 45 to 85 wt. %, from 50 to 85 wt. %, or from 50 to 80 wt. %. Oligomer products containing other weight percentage ranges of feedstock olefin dimer (or trisubstituted olefin dimer) are readily apparent from this disclosure. In some embodiments, these weight percentages can be achieved in a batch process, while in other embodiments, these weight percentages can be achieved in a flow or continuous process, such as, for example, a single pass thru a reactor (e.g., a fixed bed reactor). Thus, if the feedstock olefin comprises (or consists essentially of, or consists of)

$C_{16}$ to $C_{24}$ trisubstituted olefins (or any other carbon number or carbon number range of trisubstituted olefins disclosed herein, e.g., $C_{20}$ trisubstituted olefins), the oligomer product can comprise (or consist essentially of, or consist of) $C_{32}$ to $C_{48}$ branched olefin dimers (or any other carbon number or carbon number range of branched olefins dimers disclosed herein, e.g., $C_{40}$ branched olefin dimers).

Embodiments of this invention are directed to processes for forming an oligomer product, such as by contacting a feedstock olefin comprising trisubstituted olefins with a solid acid catalyst. The oligomer product can be formed at an oligomerization temperature in a range from $-20°$ C. to $40°$ C. (or any other oligomerization temperature disclosed herein). In some embodiments, the oligomer product (alternatively, feedstock olefin dimers; or alternatively, trisubstituted olefin dimers) can be isolated, e.g., from the residual non-oligomerized feedstock olefin, the solid acid catalyst, any solvent if utilized, etc. Thus, any of the processes described herein optionally can further comprise a step of removing at least a portion of the oligomer product (alternatively, feedstock olefin dimers; or alternatively, trisubstituted olefin dimers) from the feedstock olefin, the solid acid catalyst, solvent (if utilized), etc. The removing step can employ any separation technique disclosed herein, such as wiped film evaporation, distillation, short path distillation, filtration, etc., and this includes combinations of two or more of these techniques.

In some embodiments, the oligomer product (alternatively, feedstock olefin dimers; or alternatively, trisubstituted olefin dimers) can be hydrogenated to form a polyalphaolefin, while in other embodiments, a portion of the oligomer product (i.e., removed from the feedstock olefin, solid acid catalyst, etc.) can be hydrogenated to form a polyalphaolefin. Thus, any of the processes described herein optionally can further comprise a step of hydrogenating the oligomer product (alternatively, a portion of the oligomer product; alternatively, feedstock olefin dimers; or alternatively, trisubstituted olefin dimers) to form a polyalphaolefin. Suitable hydrogenation procedures and associated metal catalysts (e.g., platinum, rhenium, palladium, nickel, etc.) are well known to those of skill in the art.

In another embodiment consistent with the present invention, a process for forming a polyalphaolefin is disclosed, and in this embodiment, the process can comprise (1) contacting a monomer comprising any $C_6$ to $C_{24}$ normal alpha olefin disclosed herein with a catalyst system to form a dimer composition comprising trisubstituted dimers, the catalyst system comprising any metallocene compound, any chemically-treated solid oxide, and any co-catalyst disclosed herein; (2) removing at least a portion of the monomer and/or at least a portion of higher oligomers from the dimer composition to form a trisubstituted olefin composition comprising trisubstituted dimers; (3) contacting the trisubstituted olefin composition with any solid acid catalyst disclosed herein to form an oligomer product comprising olefin tetramers at any oligomerization temperature in a range from $-20°$ C. to $40°$ C. disclosed herein; (4) removing at least a portion of the oligomer product from the trisubstituted dimers and the solid acid catalyst to form a tetramer composition comprising olefin tetramers; and (5) hydrogenating the tetramer composition to form the polyalphaolefin. The dimers and tetramers are in relation to the monomer comprising a $C_6$ to $C_{24}$ normal alpha olefin of step (1). Generally, the features of this process (e.g., the features of the monomer, the normal alpha olefin, the catalyst system, the trisubstituted olefin composition (see feedstock olefin), the trisubstituted dimers (see trisubstituted olefins), the solid acid catalyst, the oligomerization temperature, the removal of at least a portion of the oligomer product, the formation of the polyalphaolefin and its composition and properties, among others) are independently described herein and these features can be combined in any combination to further describe the disclosed process for forming a polyalphaolefin.

In another embodiment consistent with the present invention, a process for forming a polyalphaolefin is disclosed, and in this embodiment, the process can comprise (1) contacting a monomer comprising any $C_6$ to $C_{24}$ normal alpha olefin disclosed herein with a catalyst system to form a reaction product comprising dimers, the catalyst system comprising any metallocene compound disclosed herein and any aluminoxane or any non-coordinating anion activator and any alkylaluminum compound disclosed herein; (2) removing at least a portion of the monomer and/or at least a portion of higher oligomers from the reaction product to form a vinylidene composition comprising vinylidenes; (3) isomerizing the vinylidene composition comprising vinylidenes to form a trisubstituted olefin composition comprising trisubstituted dimers; (4) contacting the trisubstituted olefin composition with any solid acid catalyst disclosed herein to form an oligomer product comprising olefin tetramers at any oligomerization temperature in a range from $-20°$ C. to $40°$ C. disclosed herein; (5) removing at least a portion of the oligomer product from the trisubstituted dimers and the solid acid catalyst to form a tetramer composition comprising olefin tetramers; and (6) hydrogenating the tetramer composition to form the polyalphaolefin. The dimers and tetramers are in relation to the monomer comprising a $C_6$ to $C_{24}$ normal alpha olefin of step (1). Generally, the features of this process (e.g., the features of the monomer, the normal alpha olefin, the catalyst system, the isomerizing step, the trisubstituted olefin composition (see feedstock olefin), the trisubstituted dimers (see trisubstituted olefins), the solid acid catalyst, the oligomerization temperature, the removal of at least a portion of the oligomer product, the formation of the polyalphaolefin and its composition and properties, among others) are independently described herein and these features can be combined in any combination to further describe the disclosed process for forming a polyalphaolefin.

In yet another embodiment consistent with the present invention, a process for forming a polyalphaolefin is disclosed, and in this embodiment, the process can comprise (1) contacting a monomer comprising any $C_6$ to $C_{24}$ normal alpha olefin disclosed herein with a catalyst system to form a reaction product comprising dimers, the catalyst system comprising any alkylaluminum compound disclosed herein; (2) removing at least a portion of the monomer and/or at least a portion of higher oligomers from the reaction product to form a vinylidene composition comprising vinylidenes; (3) isomerizing the vinylidene composition comprising vinylidenes to form a trisubstituted olefin composition comprising trisubstituted dimers; (4) contacting the trisubstituted olefin composition with any solid acid catalyst disclosed herein to form an oligomer product comprising olefin tetramers at any oligomerization temperature in a range from $-20°$ C. to $40°$ C. disclosed herein; (5) removing at least a portion of the oligomer product from the trisubstituted dimers and the solid acid catalyst to form a tetramer composition comprising olefin tetramers; and (6) hydrogenating the tetramer composition to form the polyalphaolefin. The dimers and tetramers are in relation to the monomer comprising a $C_6$ to $C_{24}$ normal alpha olefin of step (1). Generally, the features of this process (e.g., the features of the monomer, the normal alpha olefin, the catalyst system, the isomerizing step, the trisubstituted olefin composition (see feedstock olefin), the trisubstituted dimers (see trisubstituted olefins), the solid acid catalyst, the oligomerization temperature, the removal of at least a portion of the oligomer product, the formation of the polyalphaolefin and its composition and properties, among others) are independently described herein and these features can be combined in any combination to further describe the disclosed process for forming a polyalphaolefin.

In certain embodiments, and depending of course on the feedstock olefin (e.g., feedstock olefin comprising trisubstituted olefins, dimer composition comprising trisubstituted dimers, or trisubstituted olefin composition comprising trisubstituted dimers, etc.), PAO's can be produced from an oligomer product having at least 15 wt. %, at least 20 wt. %, at least 25 wt. %, at least 30 wt. %, at least 40 wt. %, at least 50 wt. %, at least 60 wt. %, at least 70 wt. %, at least 80 wt. %, at least 82 wt. %, at least 85 wt. %, at least 87 wt. %, or at least 90 wt. %, of feedstock olefin dimers (e.g., trisubstituted olefin dimers, or olefin tetramers, etc.). In some embodiments, PAO's can be produced from an oligomer product having a maximum amount of feedstock olefin dimers (or trisubstituted olefin dimers, or olefin tetramers, etc.) of 99 wt. %, 98 wt. %, 95 wt. %, 90 wt. %, 85 wt. %, 80 wt. %, 75 wt. %, 70 wt. %, or 65 wt. %. In other embodiments, the oligomer product from which the PAO can be produced can comprise the following illustrative and non-limiting ranges of $C_{40}$ (branched) hydrocarbons: from 80 to 99 wt. %, from 82 to 99 wt. %, from 85 to 99 wt. %, from 87 to 99 wt. %, from 90 to 99 wt. %, from 80 to 98 wt. %, from 82 to 98 wt. %, from 85 to 98 wt. %, from 80 to 95 wt. %, from 82 to 95 wt. %, or from 85 to 95 wt. %. Additionally, oligomer product from which the PAO can be produced can comprise a relatively small amount of feedstock olefin (e.g., feedstock olefin comprising trisubstituted olefins, dimer composition comprising trisubstituted dimers, or trisubstituted olefin composition comprising trisubstituted dimers, etc.). In some embodiments, the oligomer product from which the PAO can be produced can contain a maximum of 5 wt. %, 4 wt. %, 3 wt. %, 2 wt. %, 1 wt. %, or 0.5 wt. % of feedstock olefin (e.g., feedstock olefin comprising trisubstituted olefins, dimer composition comprising trisubstituted dimers, or trisubstituted olefin composition comprising trisubstituted dimers, etc.).

In still another embodiment consistent with the present invention, a process for forming a polyalphaolefin is disclosed, and in this embodiment, the process can comprise (A) contacting a feedstock olefin comprising a $C_{20}$ trisubstituted olefin with any solid acid catalyst disclosed herein to form an oligomer product comprising a $C_{40}$ olefin at any oligomerization temperature in a range from $-20°$ C. to $40°$ C. disclosed herein; (B) removing at least a portion of the oligomer product comprising the $C_{40}$ olefin from the feedstock olefin, the acid catalyst, solvent (if utilized), etc.; and (C) hydrogenating the portion of the oligomer product comprising the $C_{40}$ olefin of step (B) to form the polyalphaolefin. Generally, the features of this process (e.g., the features of the feedstock olefin, the $C_{20}$ trisubstituted olefin, the solid acid catalyst, the oligomerization temperature, the removal of at least a portion of the oligomer product, the formation of the polyalphaolefin and its composition and properties, among others) are independently described herein and these features can be combined in any combination to further describe the disclosed process for forming a polyalphaolefin. For instance, the feedstock olefin can comprise (or consist essentially of, or consist of) a compound having the structure:

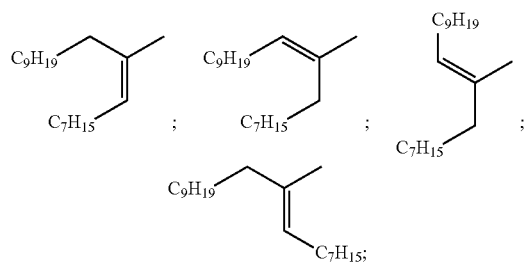

or any combination thereof. Accordingly, the feedstock olefin can contain any or all of these compounds, in any combination and at any relative amount. In one embodiment, for example, the feedstock olefin can contain all of these compounds. In another embodiment, the feedstock olefin contain can contain any one or any combination of these compounds and the vinylidene compound, 2-octyl-1-dodecene. The quantity of vinylidene compounds that can be present in the feedstock olefin is described herein and can be generally applied to the quantity of the vinylidene compound, 2-octyl-1-dodecene, that can be present in the feedstock olefin (e.g., the feedstock olefin can contain less than 50 wt. %, less than 40 wt. %, less than 30 wt. %, less than 25 wt. %, less than 20 wt. %, less than 15 wt. %, less than 10 wt. %, less than 5 wt. %, or less than 2.5 wt. %, of 2-octyl-1-dodecene, among other quantities of vinylidene disclosed herein).

The polyalphaolefins (PAO's) produced by any of the processes provided herein can have a pour point less than or equal to $0°$ C.; alternatively, less than or equal to $-10°$ C.; alternatively, less than or equal to $-20°$ C.; alternatively, less than or equal to $-30°$ C.; alternatively, less than or equal to $-35°$ C.; alternatively, less than or equal to $-40°$ C.; alternatively, less than or equal to $-45°$ C.; alternatively, less than or equal to $-50°$ C.; or alternatively, less than or equal to $-55°$ C. Often, the PAO's produced herein can have a pour point in the following non-limiting ranges: from $0°$ C. to $-100°$ C.; alternatively, from $-10°$ C. to $-95°$ C.; alternatively, from $-20°$ C. to $-90°$ C.; alternatively, from $-30°$ C. to $-90°$ C.; alternatively, from $-35°$ C. to $-90°$ C.; alternatively, from $-45°$ C. to $-90°$ C.; alternatively, from $-45°$ C. to $-85°$ C.; alternatively, from $-50°$ C. to $-85°$ C.; or alternatively, from $-50°$ C. to $-75°$ C.

The PAO's produced by any of the processes provided herein can have a viscosity index in a range from 100 to 180, from 110 to 170, or from 120 to 160. In particular embodiments, the PAO's produced herein can have a viscosity index in a range from 120 to 150; alternatively, from 120 to 145; alternatively, from 125 to 145; or alternatively, from 130 to 140.

The PAO's produced by any of the processes provided herein can have a kinematic viscosity at $100°$ C. in a range from 1 to 50 cSt; alternatively, from 1 to 25 cSt; alternatively, from 1 to 15 cSt; alternatively, from 2 to 50 cSt; alternatively, from 2 to 25 cSt; alternatively, from 2 to 15 cSt; alternatively, from 2 to 10 cSt; alternatively, from 4 to 50 cSt; alternatively, from 4 to 25 cSt; alternatively, from 4 to 20 cSt; alternatively, from 4 to 15 cSt; alternatively, from 4 to 10 cSt; alternatively, from 4 to 9 cSt; alternatively, from 4 to 8 cSt; alternatively, from 5 to 50 cSt; alternatively, from 5 to 25 cSt; alternatively, from 5 to 20 cSt; alternatively, from 5 to 15 cSt; alternatively, from 5 to 10 cSt; or alternatively, from 5 to 8 cSt.

The PAO's produced by any of the processes provided herein can have a kinematic viscosity at 40° C. in a range from 10 to 100 cSt; alternatively, from 15 to 100 cSt; alternatively, from 15 to 75 cSt; alternatively, from 15 to 60 cSt; alternatively, from 20 to 100 cSt; alternatively, from 20 to 80 cSt; alternatively, from 20 to 60 cSt; alternatively, from 20 to 50 cSt; alternatively, from 25 to 100 cSt; alternatively, from 25 to 75 cSt; alternatively, from 25 to 50 cSt; alternatively, from 25 to 45 cSt; alternatively, from 30 to 100 cSt; alternatively, from 30 to 75 cSt; alternatively, from 30 to 65 cSt; alternatively, from 30 to 55 cSt; alternatively, from 30 to 50 cSt; or alternatively, from 30 to 45 cSt.

The PAO's produced by any of the processes provided herein, unexpectedly, can have a relatively low kinematic viscosity at −40° C. For instance, these PAO's can have a kinematic viscosity at −40° C. in a range from 4,500 to 9,500 cSt, from 4,500 to 9,000 cSt, from 4,500 to 8,500 cSt, from 5,000 to 9,500 cSt, or from 5,000 to 9,000 cSt. In particular embodiments, the PAO's produced herein can have a kinematic viscosity at −40° C. in a range from 5,000 to 8,500 cSt; alternatively, from 5,000 to 8,000 cSt; alternatively, from 6,000 to 9,500 cSt; alternatively, from 6,000 to 9,000 cSt; alternatively, from 6,000 to 8,500 cSt; alternatively, from 6,500 to 9,500 cSt; alternatively, from 6,500 to 9,000 cSt; alternatively, from 6,500 to 8,500 cSt; alternatively, from 7,000 to 9,500 cSt; alternatively, from 7,000 to 9,000 cSt; alternatively, from 7,000 to 8,500 cSt; or alternatively, from 7,000 to 8,000 cSt. These low kinematic viscosities at −40° C. can be beneficial for PAO-based lubricants designed for low temperature end-use applications.

In certain embodiments, and depending of course on the feedstock olefin (amongst other variables), the PAO's produced by any of the processes provided herein can have a relatively high content of $C_{40}$ hydrocarbons (i.e., branched hydrocarbons). For instance, the PAO can comprise at least 80 wt. %, at least 82 wt. %, at least 85 wt. %, at least 87 wt. %, or at least 90 wt. %, of $C_{40}$ branched hydrocarbons. In some embodiments, the polyalphaolefin can comprise the following illustrative and non-limiting ranges of $C_{40}$ (branched) hydrocarbons: from 80 to 99 wt. %, from 82 to 99 wt. %, from 85 to 99 wt. %, from 87 to 99 wt. %, from 90 to 99 wt. %, from 80 to 98 wt. %, from 82 to 98 wt. %, from 85 to 98 wt. %, from 80 to 95 wt. %, from 82 to 95 wt. %, or from 85 to 95 wt. %. Additionally, these PAO's can contain a relatively small amount of $<C_{40}$ hydrocarbons, i.e., the polyalphaolefin is substantially free of hydrocarbons having less than 40 carbon atoms. Thus, the PAO can contain a maximum of 5 wt. % $<C_{40}$ hydrocarbons. In an embodiment, the PAO can contain a maximum of 4 wt. % $<C_{40}$ hydrocarbons, a maximum of 3 wt. % $<C_{40}$ hydrocarbons, a maximum of 2 wt. % $<C_{40}$ hydrocarbons, a maximum of 1 wt. % $<C_{40}$ hydrocarbons, or a maximum of 0.5 wt. % $<C_{40}$ hydrocarbons.

Moreover, in some embodiments, this invention encompasses the polyalphaolefin produced by any of the processes described hereinabove, and further, having any one or more of the compositional and/or viscosity properties described hereinabove.

Another embodiment of the present invention is directed to a polyalphaolefin (PAO), and such PAO can comprise, for instance, at least 80 wt. % $C_{40}$ saturated branched hydrocarbons, and the PAO can have a kinematic viscosity at −40° C. in a range from 4,500 to 9,500 cSt, or from 5,000 to 9,000 cSt. In an embodiment, the PAO can comprise from 80 to 99 wt. %, from 80 to 95 wt. %, or from 85 to 99 wt. % $C_{40}$ hydrocarbons, and/or the PAO can contain a maximum of 5 wt. %, 3 wt. %, or 1 wt. % $<C_{40}$ hydrocarbons. Additionally or alternatively, the PAO can have a pour point in a range from −45 to −85° C., or from −50 to −75° C., and/or the PAO can have a viscosity index in a range from 120 to 150, from 125 to 145, or from 130 to 140. Additionally or alternatively, the PAO can have a kinematic viscosity at 100° C. in a range from 4 to 10 cSt, from 4 to 9 cSt, or from 5 to 8 cSt, and/or a kinematic viscosity at 40° C. in a range from 25 to 50 cSt, from 25 to 45 cSt, or from 30 to 45 cSt. Further, in some embodiments, the PAO can have a kinematic viscosity at −40° C. in a range from 5,500 to 9,000 cSt, from 6,000 to 9,000 cSt, from 6,500 to 9,000 cSt, or from 7,000 to 8,500 cSt.

Lubricant compositions can be formed from, and/or can comprise, the polyalphaolefins produced in accordance with this invention. A lubricant composition can comprise (or consist essentially of, or consist of) a polyalphaolefin described herein with or without additives, such as metal deactivators, detergents, dispersants, antioxidants, and the like. Typical lubricant compositions and additives are disclosed in, for example, U.S. Patent Publication No. 2010-0317904.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Gas chromatographic (GC) analyses were performed using a split injection method on an HP 5890 gas chromatograph with a flame ionization detector (FID). Initial oven temperature was 100° C. for 2 minutes and increased 8° C./min to 185° C. then 20° C./min to 290° C. for 6 minutes. The column was an HP-1 column, 12 m×0.2 mm×0.33 μm. Data analysis was performed using Chemstation® software.

$^{13}$C NMR analyses were performed on a Bruker Advance 3 NMR. The analyses were performed using $CDCl_3$ as a solvent. The $^{13}$C NMR analyses were performed at a field strength of approximately 100.6 MHz, a power level of approximately 87.07 W, a P1 of 13.65 μsec, and a PL1 of −4.00 dB.

Kinematic viscosities at 100° C., 40° C., and −40° C. were determined in accordance with ASTM D7042-04 at the respective temperatures, and the results are reported in centistokes (cSt). The viscosity index was determined in accordance with ASTM D7042-04, using the Tables provided therein for viscosity data determined at 100° C. and 40° C. Pour point is a measurement of the temperature at which the sample will begin to flow under carefully controlled conditions. Pour point was determined in accordance with ASTM D97-04, and the results are reported in ° C.

A silica-alumina was obtained from W.R. Grace Company containing about 13% alumina by weight and having a surface area of about 400 m$^2$/g and a pore volume of about 1.2 mL/g. This material was obtained as a powder having an average particle size of about 70 microns. Approximately 100 grams of this material were impregnated with a solution containing about 200 mL of water and about 10 grams of ammonium hydrogen fluoride, resulting in a damp powder having the consistency of wet sand. This mixture was then placed in a flat pan and allowed to dry under vacuum at approximately 110° C. for about 16 hours. To calcine the support, about 10 grams of this powdered mixture were placed in a 1.75-inch quartz tube fitted with a sintered quartz disk at the bottom. While the powder was supported on the disk, air (nitrogen can be substituted) dried by passing through a 13× molecular sieve column, was blown upward through the disk at the linear rate of about 1.6 to 1.8 standard cubic feet per hour. An electric furnace around the quartz tube was then turned on and the temperature was raised at the rate of about 400° C. per hour to the desired calcining temperature of about 450° C. At this temperature, the powder was allowed to fluidize for about three hours in the dry air. Afterward, the fluorided silica-alumina was collected and stored under dry nitrogen, and was used without exposure to the atmosphere.

Example 1

Preparation of 1-Decene Dimer Using a Metallocene and a Chemically Treated Solid Oxide Approximately 1200 grams of anhydrous 1-decene (Chevron Phillips Chemical Company) were charged under nitrogen atmosphere to a 3-L round bottom flask equipped with a heating unit, condenser, and magnetic stirrer. After the temperature was increased to 100° C., triisobutylaluminum (1.125 g in 40% toluene solution, Aldrich) was added to the flask. Then, bis(pentamethylcyclopentadienyl)hafnium dichloride (18.75 mg in 2.34 mL toluene) was added to the flask, followed by the chemically treated solid oxide (fluorided silica-alumina, 2.25 g). The dimerization reaction was conducted for about 12-15 hr at 100° C. After cooling to room temperature, 2 mL of water was added to the reaction mixture, and the solids were removed via filtration, resulting in a clear and colorless liquid.

The liquid product was separated by short-path distillation on a Kugelrohr distillation unit at 1 mm Hg vacuum. The unreacted 1-decene was collected at 120-140° C. and was approximately 10 wt. % of the liquid product, 1-decene dimer ($C_{20}$) was collected at 180-190° C. and was approximately 40 wt. % of the liquid product, and the remaining 50 wt. % was trimer and higher oligomers.

Example 2

Preparation of 1-Decene Dimer Using a Metallocene and an Aluminoxane

In Example 2, a dimer of 1-decene was produced using a catalyst system containing a metallocene compound and an aluminoxane, as described on page 20 of U.S. Patent Publication No. 2008-0146469.

Figure 2:
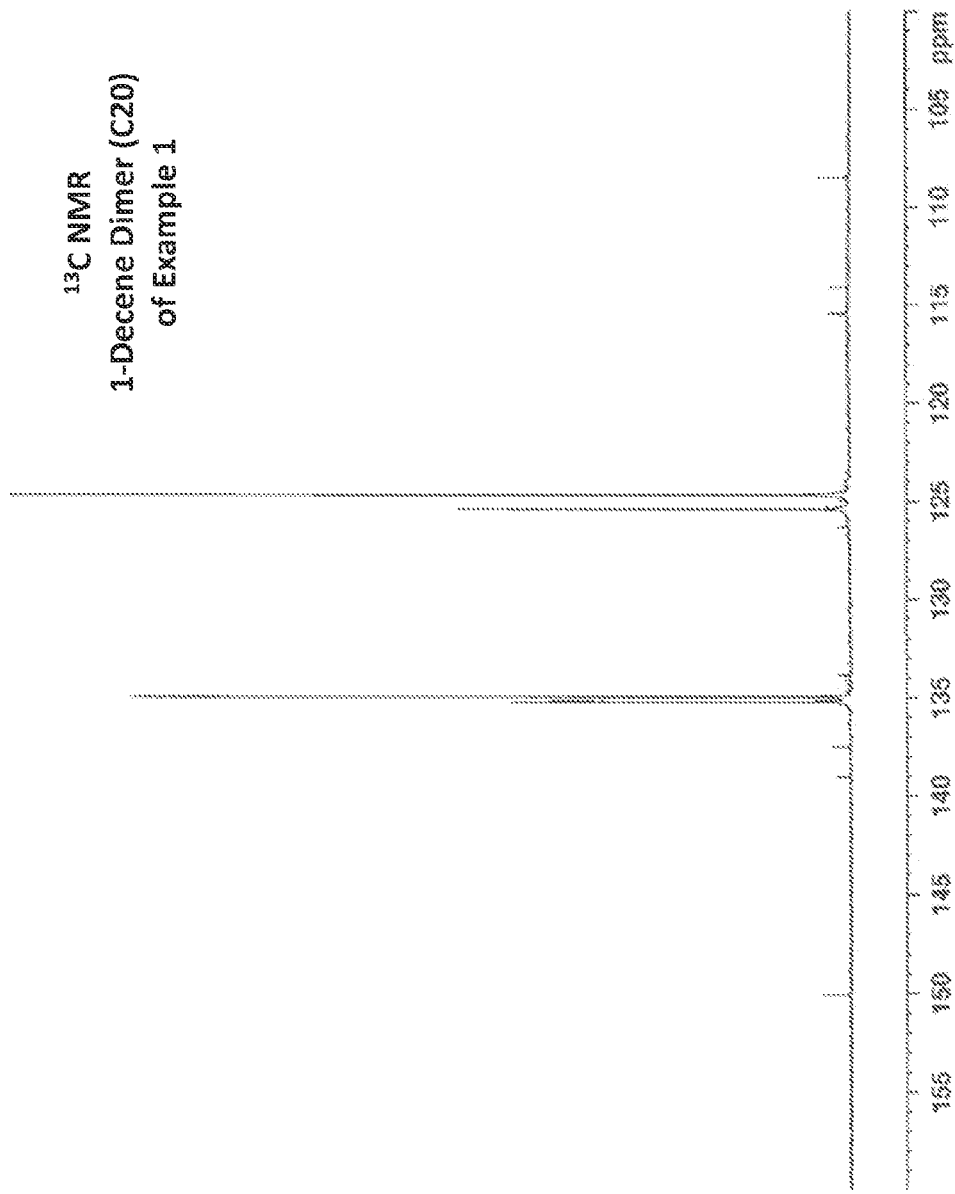
FIG. 2 presents a portion of the $^{13}$C NMR plots of the 1-decene dimer ($C_{20}$) of Example 1.
Figure 3:
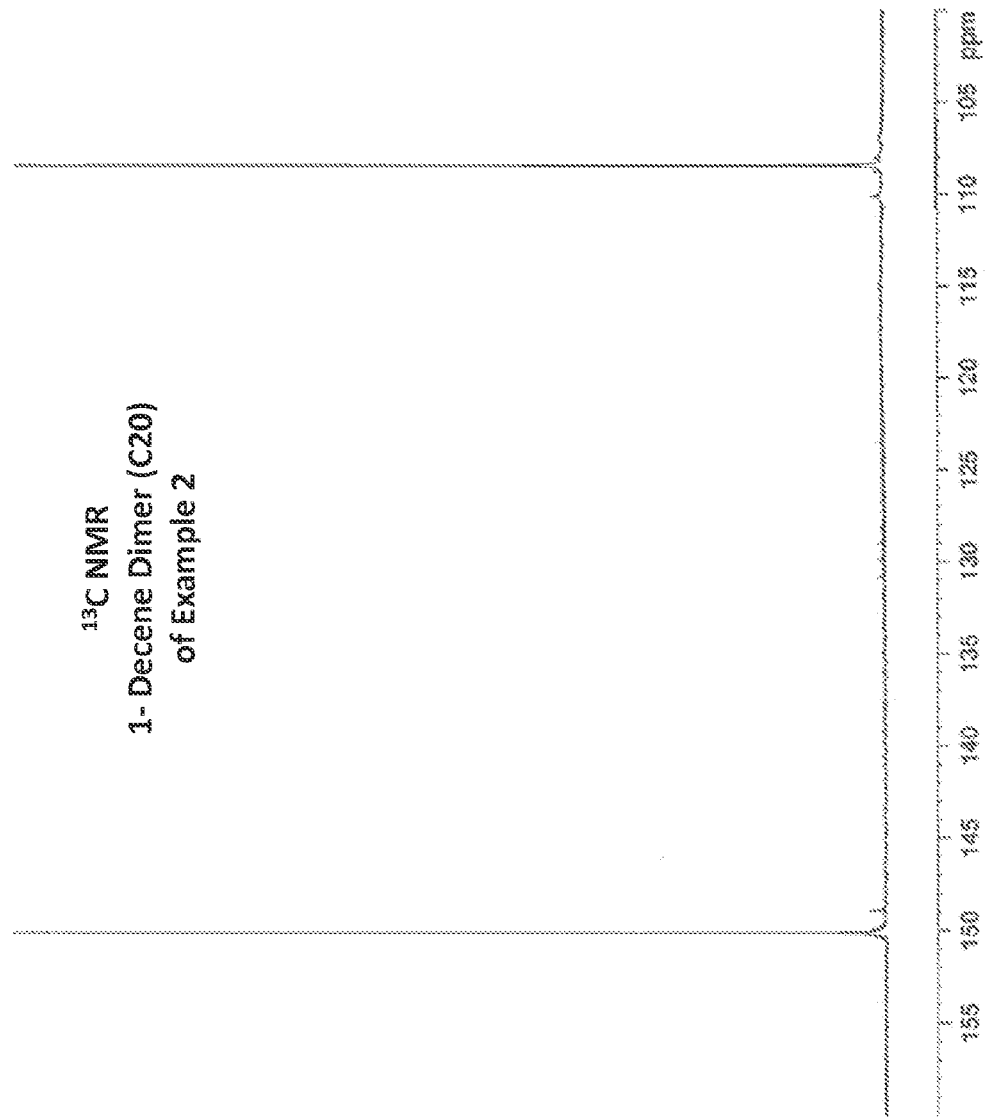
FIG. 3 presents a portion of the $^{13}$C NMR plots of the 1-decene dimer ($C_{20}$) of Example 2.

The products of Example 1 and Example 2 were subjected to gas chromatography ("GC") analysis and $^{13}C$ NMR analysis. FIG. 1 provides the GC plots from the GC analyses of the 1-decene dimers produced in Example 1 and Example 2. These GC plots show that there are significant composition differences between the two 1-decene dimer products. FIG. 2 and FIG. 3 provide the $^{13}C$ NMR of the olefinic region (100 to 169 ppm) for the 1-decene dimers produced in Example 1 and Example 2, respectively. The $^{13}C$ NMR of the olefinic region of the two 1-decene dimers show that there are significant composition differences between the two 1-decene dimer products. Specifically, the 1-decene dimer produced in Example 1 contained mostly trisubstituted olefin and some observable quantities of vinylidene and other olefinic products, while the 1-decene dimer produced in Example 2 contained almost exclusively vinylidene.

Examples 3-9

1-Decene Dimer of Example 1

Oligomerization with AMBERLYST® 15 Resin at Temperatures from 25° C. to 110° C.

Oligomer products from the 1-decene dimer of Example 1 were produced using the following general procedure. The 1-decene dimer ($C_{20}$) fraction was added under nitrogen atmosphere to a four-neck, 1-L round bottom flask, equipped with a stirring bar, heating unit, and a condenser, followed by AMBERLYST® 15 resin at an amount equal to 20% of the weight of the decene dimer. The reactor contents were stirred and heated to the designated reaction temperature (see Table I), and held at that reaction temperature for 24-48 hours. AMBERLYST® 15 was then removed from by simple filtration using filter paper. The filtered liquid portion of the reaction mixture was then subjected to vacuum distillation on a Kugelrohr distillation unit at 1 mm Hg vacuum to remove the unreacted dimers (collected at 180-190° C.) from the oligomer product.

Figure 4:
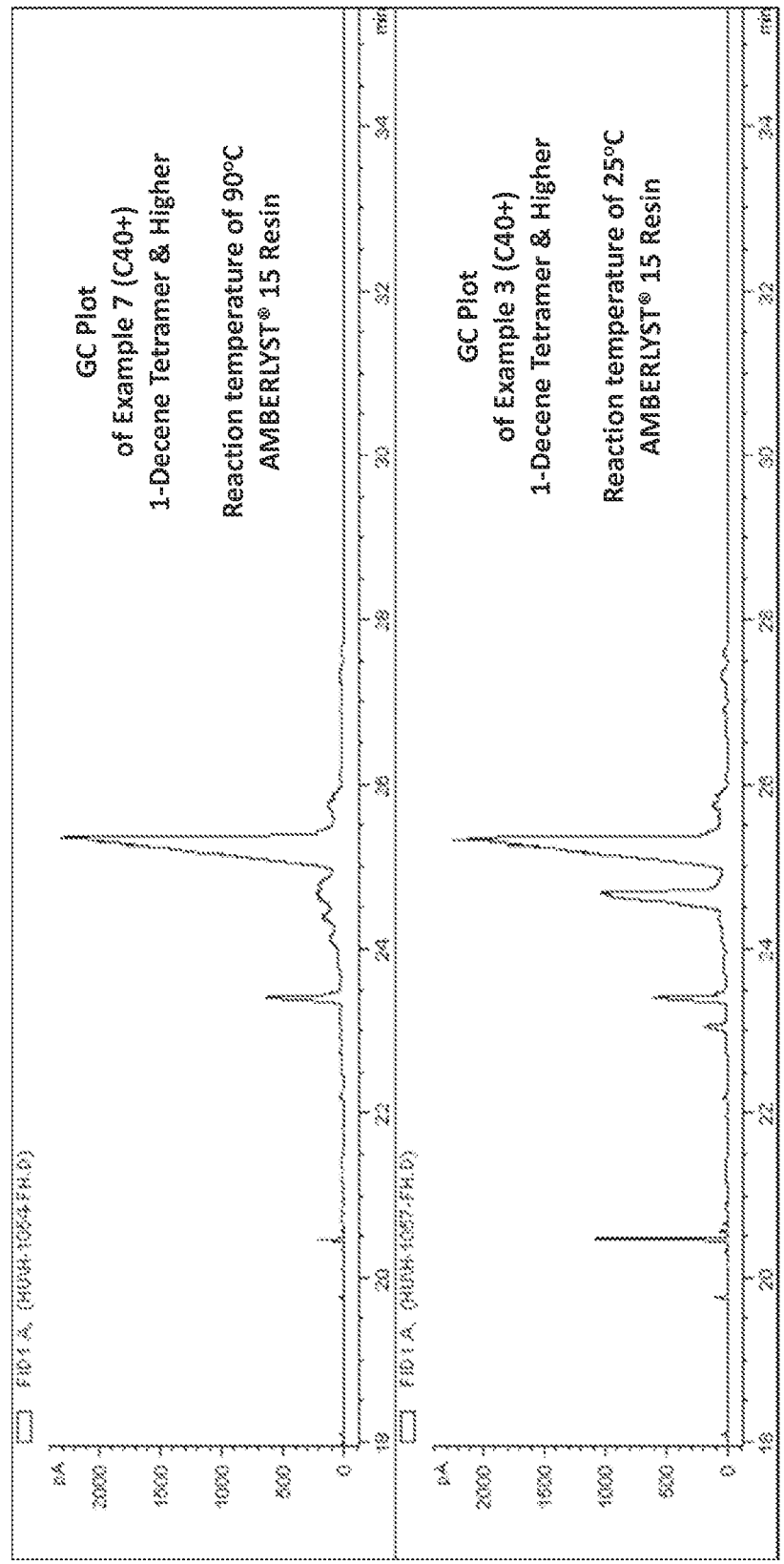
FIG. 4 presents gas chromatography plots of the 1-decease tetramer and higher oligomer products ($C_{40}$+) of Example 3 and Example 7.

Of the tetramer and higher oligomer ($C_{40}$+) product (the mers being in relation to 1-decene; e.g., tetramer refers to tetramers of 1-decene ($C_{40}$)), approximately 90 wt. % was tetramer ($C_{40}$). FIG. 4 provides GC plots from the GC analysis of the tetramer and higher oligomer ($C_{40}$+) product produced from the 1-decene dimer of Example 1 at 90° C. (Example 7) and 25° C. (Example 3). These GC plots show that the temperature at which the 1-decene dimer of Example 1 was oligomerized impacted the compositional make-up of the tetramer and higher oligomer ($C_{40}$+) product.

The resultant tetramer and higher oligomer ($C_{40}$+) product was hydrogenated as follows. Approximately 100 g of the product and 5 g of a nickel hydrogenation catalyst (Crossfield HTC 500) were charged to a 1-L autoclave reactor, which was then flushed with nitrogen to replace any residual air, followed by flushing with low pressure hydrogen several times. The reactor was then pressurized with hydrogen to 500 psig, followed by incrementally increasing the temperature to 180° C. The hydrogenation temperature was eventually increased to 200° C. and hydrogen pressure was increased to 2000 psig and maintained at that pressure for 4 hr to complete the hydrogenation. After the reactor contents were cooled to ambient temperature and residual catalyst was removed by filtration, the resultant $C_{40}$+ PAO was a colorless liquid.

Table I summarizes the physical properties of the $C_{40}$+ PAO's of Examples 3-9, after hydrogenation, as a function of the oligomerization reaction temperature in the presence of AMBERLYST® 15 resin. Surprisingly, the temperature at which the 1-decene dimer of Example 1 was oligomerized impacted the resultant physical properties of the $C_{40}$+ PAO's. Additionally, the $C_{40}$+ PAO of Example 3, produced from the 1-decene dimer of Example 1 using AMBERLYST® 15 resin at 25° C., had a viscosity at −40° C. that was at least 25% less than at any other temperature tested (7.850 cSt versus 10,300-17,120 cSt). Moreover, the yield at 25° C. (of $C_{40}$+ oligomer product) was unexpectedly superior to the respective yields at the higher oligomerization temperatures of 50-110° C.

Examples 10-11

1-Decene Dimer of Example 2

Oligomerization with AMBERLYST® 15 Resin at Temperatures of 25° C. and 90° C.

Figure 5:
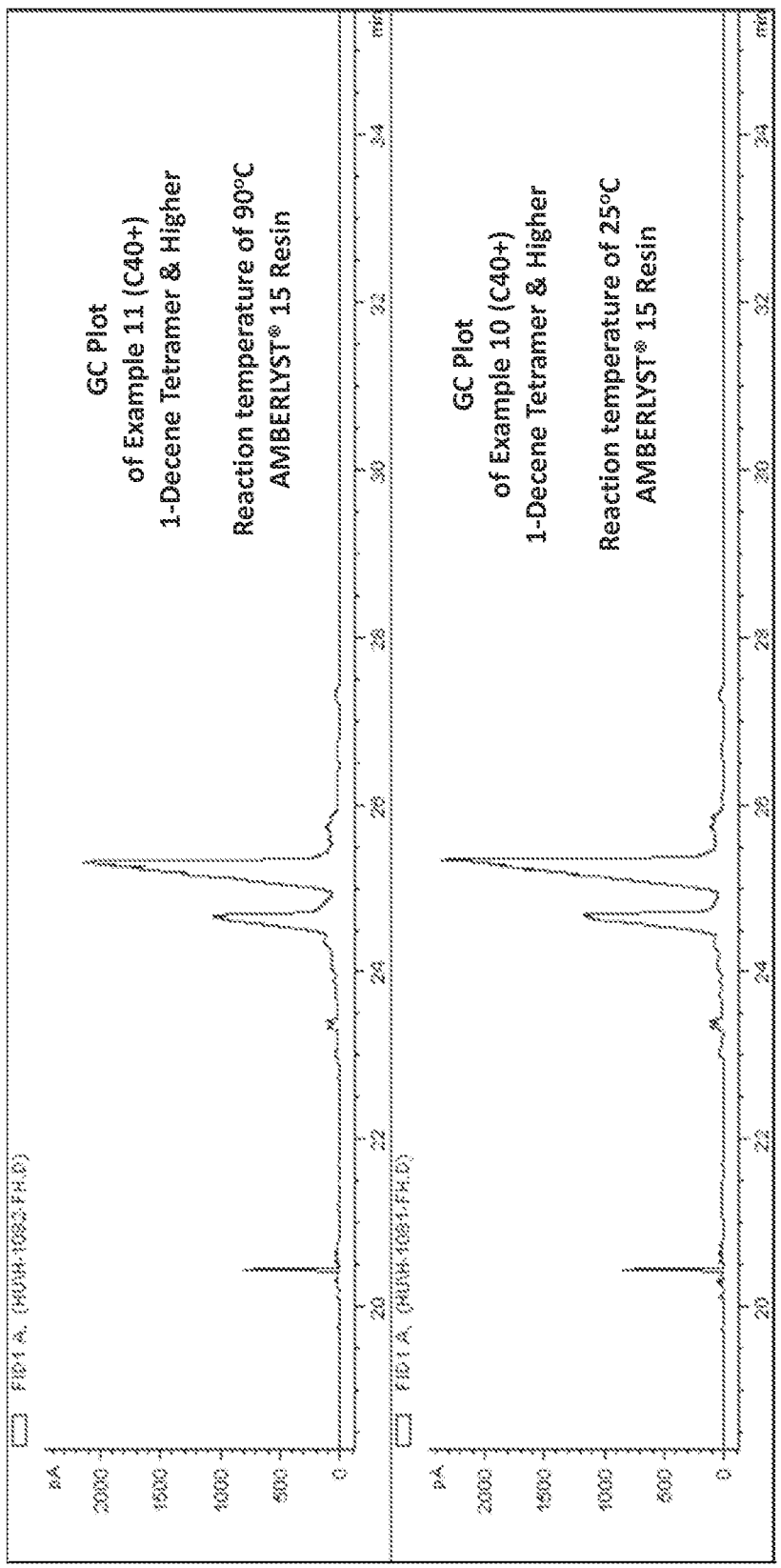
FIG. 5 presents gas chromatography plots of the 1-decene tetramer and higher oligomer products ($C_{40}$+) of Example 10 and Example 11.

Oligomer products from the 1-decene dimer of Example 2 were produced at 25° C. (Example 10) and 90° C. (Example 11) following the general procedure utilized for Examples 3-9, with the change of substituting the 1-decene dimer of Example 2 for the 1-decene dimer of Example 1. The tetramer and higher oligomer product (the mers being in relation to 1-decene; e.g. tetramer refers to tetramers of 1-decene ($C_{40}$)) was removed from the reaction mixture by vacuum distillation and subsequently hydrogenated using the same general procedures utilized for Examples 3-9. FIG. 5 provides GC plots from the GC analysis of the tetramer and higher oligomer ($C_{40}+$) product produced from the 1-decene dimer of Example 2 at 90° C. (Example 11) and 25° C. (Example 10). These GC plots show that the temperature at which the 1-decene dimer of Example 2 was oligomerized does not significantly affect the compositional make-up of the tetramer and higher oligomer ($C_{40}+$) product. The resultant tetramer and higher oligomer ($C_{40}+$) product was hydrogenated using the same general hydrogenation procedure as in Examples 3-9.

Table II summarizes the physical properties of the $C_{40}+$ PAO's of Examples 10-11, after hydrogenation, as a function of the oligomerization reaction temperature in the presence of AMBERLYST® 15 resin. This data shows that while the 40° C. and 100° C. viscosity changed in response to oligomerization temperature, there was no significant impact on the viscosity at −40° C. due to the oligomerization temperature. FIG. 5 demonstrates that the temperature at which the 1-decene dimer of Example 2 was oligomerized did not appear to have a significant effect on the resultant composition of the $C_{40}+$ PAO.

Comparison of Oligomers Produced from the 1-Decene Dimers of Example 1 and Example 2

Table II compares the physical properties of the $C_{40}+$ PAO's produced at 25° C. and 90° C. from the 1-decene dimer of Example 1 (Examples 3 and 7, respectively) and the physical properties of the $C_{40}+$ PAO's produced at 25° C. and 90° C. from the 1-decene dimer of Example 2 (Examples 10 and 11, respectively). Unexpectedly, the $C_{40}+$ PAO of Example 3, produced using AMBERLYST® 15 resin at 25° C., had a viscosity at −40° C. that was about 20% less than the respective viscosities of Examples 10-11 (7,850 cSt versus 9,680-9,800 cSt).

While not wishing to be bound by theory, Applicants believe that the 1-decene dimer ($C_{20}$) of Example 1 may have a small amount (e.g., less than 10 wt. %) of vinylidene, but may contain an isomeric mixture of the following four trisubstituted olefins:

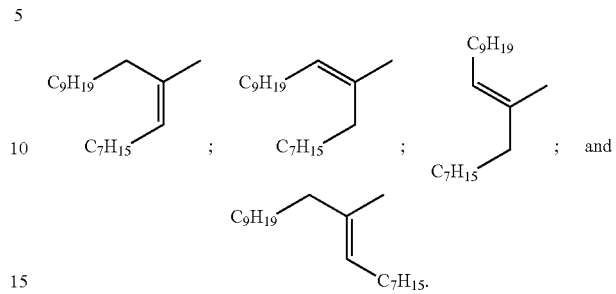

Further, while not wishing to be bound by theory, Applicants believe that the differences between the 1-decene dimer ($C_{20}$) of Example 1 and the 1-decene dimer of Example 2 in combination with the temperature at which the 1-decene dimers are oligomerized in the presence of a solid acid catalyst (e.g., Amberlyst® resin) impacted the properties of the oligomer product. These composition differences in the two 1-decene dimers are demonstrated in the GC plots and $^{13}C$ NMR provided in FIGS. 1-3. The GC plots of the tetramer and higher oligomer ($C_{40}+$) product of Examples 3, 7, and 10-11, provided in FIGS. 4-5, demonstrate that these materials are compositionally different, but the exact structural breakdown and the cause of the associated (and unexpectedly) low viscosity at −40° C. for Example 3 could not be determined.

TABLE I

Examples 3-9

| Example | 3 | 4 | 5 | 6 | 7 | 8 | 9 |
|---|---|---|---|---|---|---|---|
| Reaction Temperature (° C.) | 25 | 50 | 60 | 70 | 90 | 100 | 110 |
| Viscosity @ −40° C. (cSt) | 7,850 | 10,300 | 11,550 | 10,660 | 13,860 | 13,500 | 17,120 |
| Viscosity @ 40° C. (cSt) | 35.7 | 32.5 | 36.3 | 35.9 | 41.4 | 39.4 | 43.1 |
| Viscosity @ 100° C. (cSt) | 6.5 | 6.1 | 6.5 | 6.5 | 7.1 | 6.9 | 7.1 |
| Viscosity Index | 135 | 139 | 134.5 | 134.5 | 134 | 133 | 130.5 |
| Pour Point (° C.) | −65 | −65 | −62 | −53 | −61 | −59 | −65 |
| Yield - $C_{40}$ + product (wt. %) | 72 | 64 | 65 | 65 | 60 | 64 | 64 |

TABLE II

Examples 3, 7, and 10-11

| Example | 3 | 7 | 10 | 11 |
|---|---|---|---|---|
| Reaction Temperature (° C.) | 25 | 90 | 25 | 90 |
| Viscosity @ −40° C. (cSt) | 7,850 | 13,860 | 9,800 | 9,680 |
| Viscosity @ 40° C. (cSt) | 35.7 | 41.4 | 36.8 | 43.7 |
| Viscosity @ 100° C. (cSt) | 6.5 | 7.1 | 6.6 | 7.4 |
| Viscosity Index | 135 | 134 | 135 | 134 |
| Pour Point (° C.) | −65 | −61 | −65 | −62 |

The invention is described above with reference to numerous aspects and embodiments, and specific examples. Many variations will suggest themselves to those skilled in the art in light of the above detailed description. All such obvious variations are within the full intended scope of the appended claims. Other embodiments of the invention can include, but are not limited to, the following (embodiments typically are described as "comprising" but, alternatively, can "consist essentially of" or "consist of" unless specifically stated otherwise):

Embodiment 1

A process comprising contacting a feedstock olefin with a solid acid catalyst to form an oligomer product at an oligomerization temperature in a range from −20° C. to 40° C., wherein the feedstock olefin comprises trisubstituted olefins.

Embodiment 2

The process defined in embodiment 1, wherein the solid acid catalyst comprises any acidic ion exchange resin disclosed herein.

Embodiment 3

The process defined in embodiment 1, wherein the solid acid catalyst comprises any functionalized styrene-divinylbenzene polymer, any 4-vinylpyridine divinylbenzene polymer, or any tetrafluoroethylene polymer modified with perfluorovinyl ether groups terminated with sulfonate groups disclosed herein, as well as combinations thereof.

Embodiment 4

The process defined in embodiment 1, wherein the solid acid catalyst comprises any AMBERLYST® resin and/or any NAFION® resin disclosed herein.

Embodiment 5

The process defined in embodiment 1, wherein the solid acid catalyst comprises AMBERLYST® 15 resin.

Embodiment 6

The process defined in any of the preceding embodiments, wherein the oligomerization temperature is in any oligomerization temperature range disclosed herein, for example, from 0° C. to 40° C., from 10° C. to 40° C., from 15° C. to 35° C., from 20° C. to 30° C., etc.

Embodiment 7

The process defined in any of embodiments 1-6, wherein a weight ratio of the feedstock olefin (or the trisubstituted olefins) to the solid acid catalyst is in any range of weight ratios disclosed herein, for example, from 1:1 to 100:1, from 2:1 to 75:1, from 5:1 to 40:1, from 5:1 to 30:1, etc.

Embodiment 8

The process defined in any of embodiments 1-6, wherein the process is conducted in a fixed bed reactor, and wherein the feedstock olefin (or the trisubstituted olefins) and the solid acid catalyst are contacted at a WHSV in any range of WHSV's disclosed herein, for example, from 0.05 to 5, from 0.1 to 3, from 0.5 to 2.5, etc.

Embodiment 9

The process defined in any of the preceding embodiments, wherein a conversion (or single pass conversion) of the feedstock olefin (or the trisubstituted olefins) to the oligomer product is in any range of conversions (or single pass conversions) disclosed herein, for example, from 25 to 95 wt. %, from 40 to 95 wt. %, from 50 to 90 wt. %, from 60 to 90 wt. %, etc.

Embodiment 10

The process defined in any of the preceding embodiments, wherein the feedstock olefin is produced by a process comprising isomerizing a vinylidene composition comprising any $C_{12}$ to $C_{48}$ vinylidene disclosed herein.

Embodiment 11

The process defined in embodiment 10, wherein the vinylidene composition is produced by a process comprising contacting a monomer comprising any $C_6$ to $C_{24}$ normal alpha olefin disclosed herein with any alkylaluminum compound disclosed herein.

Embodiment 12

The process defined in embodiment 10, wherein the vinylidene composition is produced by a process comprising (i) contacting a monomer comprising any $C_6$ to $C_{24}$ normal alpha olefin disclosed herein with any alkylaluminum compound disclosed herein to produce a reaction product comprising monomer, dimer, and higher oligomers (if any), and (ii) removing at least a portion of the monomer and/or at least a portion of the higher oligomers from the reaction product to produce the vinylidene composition.

Embodiment 13

The process defined in embodiment 12, wherein the removing step is performed using any technique disclosed herein, for example, wiped film evaporation, distillation, short path distillation, filtration, etc., as well as combinations thereof.

Embodiment 14

The process defined in embodiment 10, wherein the vinylidene composition is produced by a process comprising contacting a monomer comprising any $C_6$ to $C_{24}$ normal alpha olefin disclosed herein with a catalyst system comprising any metallocene compound and any aluminoxane disclosed herein.

Embodiment 15

The process defined in embodiment 10, wherein the vinylidene composition is produced by a process comprising (i) contacting a monomer comprising any $C_6$ to $C_{24}$ normal alpha olefin with a catalyst system comprising any metallocene compound and any aluminoxane disclosed herein to produce a reaction product comprising monomer, dimer, and higher oligomers, and (ii) removing at least a portion of the monomer and/or at least a portion of the higher oligomers from the reaction product to produce the vinylidene composition.

Embodiment 16

The process defined in embodiment 15, wherein the removing step is performed using any technique disclosed herein, for example, wiped film evaporation, distillation, short path distillation, filtration, etc., as well as combinations thereof.

Embodiment 17

The process defined in embodiment 10, wherein the vinylidene composition is produced by a process comprising contacting a monomer comprising any $C_6$ to $C_{24}$ normal alpha olefin disclosed herein with a catalyst system comprising any metallocene compound, any non-coordinating anion activator, and any alkylaluminum compound disclosed herein.

Embodiment 18

The process defined in embodiment 10, wherein the vinylidene composition is produced by a process comprising (i) contacting a monomer comprising any $C_6$ to $C_{24}$ normal alpha olefin disclosed herein with a catalyst system any metallocene compound, any non-coordinating anion activator, and any alkylaluminum compound disclosed herein to produce a reaction product comprising monomer, dimer, and higher oligomers, and (ii) removing at least a portion of the monomer and/or at least a portion of the higher oligomers from the reaction product to produce the vinylidene composition.

Embodiment 19

The process defined in embodiment 18, wherein the removing step is performed using any technique disclosed herein, for example, wiped film evaporation, distillation, short path distillation, filtration, etc., as well as combinations thereof.

Embodiment 20

The process defined in any of embodiments 1-9, wherein the feedstock olefin is produced by a process comprising contacting a monomer comprising any $C_6$ to $C_{24}$ normal alpha olefin disclosed herein with a catalyst system comprising any metallocene compound, any chemically-treated solid oxide, and any co-catalyst disclosed herein.

Embodiment 21

The process defined in any of embodiments 1-9, wherein the feedstock olefin is produced by a process comprising (i) contacting a monomer comprising any $C_6$ to $C_{24}$ normal alpha olefin with a catalyst system comprising any metallocene compound, any chemically-treated solid oxide, and any co-catalyst disclosed herein to produce a reaction product comprising monomer, dimer comprising trisubstituted olefins, and higher oligomers, and (ii) removing at least a portion of the monomer and/or at least a portion of the higher oligomers from the reaction product to produce the feedstock olefin.

Embodiment 22

The process defined in embodiment 21, wherein the removing step is performed using any technique disclosed herein, for example, wiped film evaporation, distillation, short path distillation, filtration, etc., as well as combinations thereof.

Embodiment 23

The process defined in any of embodiments 20-22, wherein the chemically-treated solid oxide comprises any solid oxide treated with any electron withdrawing anion disclosed herein.

Embodiment 24

The process defined in any of embodiments 20-23, wherein the chemically-treated solid oxide comprises fluorided alumina, chlorided alumina, bromided alumina, sulfated alumina, fluorided silica-alumina, chlorided silica-alumina, bromided silica-alumina, sulfated silica-alumina, fluorided silica-zirconia, chlorided silica-zirconia, bromided silica-zirconia, sulfated silica-zirconia, fluorided silica-titania, fluorided silica-coated alumina, sulfated silica-coated alumina, phosphated silica-coated alumina, or any combination thereof.

Embodiment 25

The process defined in any of embodiments 20-24, wherein the chemically-treated solid oxide comprises fluorided alumina, sulfated alumina, fluorided silica-alumina, fluorided silica-coated alumina, or any combination thereof.

Embodiment 26

The process defined in any of embodiments 20-25, wherein the metallocene compound comprises any unbridged metallocene compound containing zirconium or hafnium disclosed herein.

Embodiment 27

The process defined in any of embodiments 20-25, wherein the metallocene compound comprises any bridged metallocene compound containing zirconium or hafnium disclosed herein.

Embodiment 28

The process defined in any of embodiments 20-27, wherein a weight ratio of the chemically-treated solid oxide to the metallocene compound is in any range of weight ratios disclosed herein, for example, from 50:1 to 1000:1, from 100:1 to 500:1, etc.

Embodiment 29

The process defined in any of embodiments 20-28, wherein the co-catalyst comprises any organoaluminum compound, any organozinc compound, any organomagnesium compound, or any organolithium compound disclosed herein, as well as combinations thereof.

Embodiment 30

The process defined in any of embodiments 20-29, wherein the co-catalyst comprises any organoaluminum compound disclosed herein.

Embodiment 31

The process defined in embodiment 30, wherein the organoaluminum compound comprises trimethylaluminum, triethylaluminum, tri-n-propylaluminum, tri-n-butylaluminum, triisobutylaluminum, tri-n-hexylaluminum, tri-n-octylaluminum, diisobutylaluminum hydride, diethylaluminum ethoxide, diethylaluminum chloride, or any combination thereof.

Embodiment 32

The process defined in any of embodiments 29-31, wherein a molar ratio of aluminum of the organoaluminum compound to transition metal of the metallocene compound is in any range of molar ratios disclosed herein, for example, from 5:1 to 250:1, from 10:1 to 100:1, etc.

Embodiment 33

The process defined in any of embodiments 20-32, wherein a weight ratio of the monomer (or normal alpha olefin) to the metallocene compound is in any range of weight ratios disclosed herein, for example, from 10,000:1 to 350,000:1, from 12,000:1 to 320,000:1, from 15,000:1 to 250,000:1, etc.

Embodiment 34

The process defined in any of embodiments 20-33, wherein the monomer and the catalyst system are contacted by combining the monomer, the metallocene compound, the chemically-treated solid oxide, and the co-catalyst in any order.

Embodiment 35

The process defined in any of embodiments 20-34, wherein the monomer and the catalyst system are contacted at a reaction temperature in any range of reaction temperatures disclosed herein, from 60° C. to 140° C., from 70° C. to 130° C., from 80° C. to 120° C., etc.

Embodiment 36

The process defined in any of embodiments 20-35, wherein a conversion of the normal alpha olefin to trisubstituted olefins of the feedstock olefin is in any range of normal alpha olefin conversions disclosed herein, for example, from 2 to 95 wt. %, from 2 to 50 wt. %, from 5 to 90 wt. %, from 5 to 50 wt. %, etc.

Embodiment 37

The process defined in any of embodiments 11-36, wherein the monomer comprises (or consists essentially of, or consists of) a $C_6$ to $C_{16}$ normal alpha olefin.

Embodiment 38

The process defined in any of embodiments 11-37, wherein the monomer comprises (or consists essentially of, or consists of) a $C_8$ to $C_{12}$ normal alpha olefin.

Embodiment 39

The process defined in any of embodiments 11-38, wherein the monomer comprises (or consists essentially of, or consists of) 1-decene.

Embodiment 40

The process defined in any of the preceding embodiments, wherein the feedstock olefin comprises an amount of trisubstituted olefins in any range of weight percentages of trisubstituted olefins disclosed herein, for example, at least 75 wt. %, from 10 to 99 wt. %, from 20 to 85 wt. %, etc.

Embodiment 41

The process defined in any of the preceding embodiments, wherein the feedstock olefin comprises (or consists essentially of, or consists of) $C_{12}$ to $C_{48}$ trisubstituted olefins.

Embodiment 42

The process defined in any of the preceding embodiments, wherein the feedstock olefin comprises (or consists essentially of, or consists of) trisubstituted $C_{20}$ olefins.

Embodiment 43

The process defined in any of the preceding embodiments, wherein the feedstock olefin comprises (or consists essentially of, or consists of) a compound having the structure:

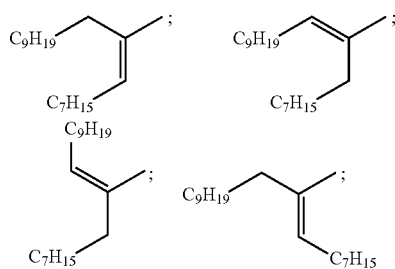

or any combination thereof.

Embodiment 44

The process defined in any of the preceding embodiments, wherein the oligomer product comprises an amount of feedstock olefin dimer (or trisubstituted olefin dimer) of greater than or equal to any minimum amount or in any range disclosed herein, for example, at least 25 wt. %, at least 70 wt. %, in a range from 25 to 99 wt. %, in a range from 30 to 90 wt. %, etc.

Embodiment 45

The process defined in any of the preceding embodiments, wherein the oligomer product comprises (or consists essentially of, or consists of) $C_{40}$ branched olefin dimers.

Embodiment 46

The process defined in any of the preceding embodiments, wherein the process further comprises a step of removing at least a portion of the oligomer product from the feedstock olefin, the solid acid catalyst, solvent (if utilized), etc.

Embodiment 47

The process defined in embodiment 46, wherein the removing step is performed using any technique disclosed herein, for example, wiped film evaporation, distillation, short path distillation, filtration, etc., as well as combinations thereof.

Embodiment 48

The process defined in any of the preceding embodiments, wherein the process further comprises a step of hydrogenating the oligomer product (or the portion of the oligomer product) to form a polyalphaolefin.

Embodiment 49

The process defined in embodiment 48, wherein the polyalphaolefin comprises at least 80 wt. % $C_{40}$ branched hydrocarbons.

Embodiment 50

The process defined in embodiment 48 or 49, wherein the polyalphaolefin has a kinematic viscosity at −40° C. in any range of kinematic viscosities at −40° C. disclosed herein, for example, from 5,000 to 9.000 cSt, from 6.000 to 9,000 cSt, from 6,500 to 9,000 cSt, from 7,000 to 8,500 cSt, etc.

Embodiment 51

The process defined in any of embodiments 48-50, wherein the polyalphaolefin has a kinematic viscosity at 100° C. in any range of kinematic viscosities at 100° C. disclosed herein, for example, from 4 to 10 cSt, from 4 to 9 cSt, from 5 to 8 cSt, etc.

Embodiment 52

The process defined in any of embodiments 48-51, wherein the polyalphaolefin has a kinematic viscosity at 40° C. in any range of kinematic viscosities at 40° C. disclosed herein, for example, from 25 to 50 cSt, from 25 to 45 cSt, from 30 to 45 cSt, etc.

Embodiment 53

The process defined in any of embodiments 48-52, wherein the polyalphaolefin has a viscosity index in any range of viscosity indices disclosed herein, for example, from 120 to 150, from 125 to 145, from 130 to 140, etc.

Embodiment 54

The process defined in any of embodiments 48-53, wherein the polyalphaolefin has a pour point less than or equal to any maximum pour point or in any range of pour points disclosed herein, for example, less than or equal to −40° C., in a range from −45 to −85° C., in a range from −50 to −75° C., etc.

Embodiment 55

The process defined in any of embodiments 48-54, wherein the polyalphaolefin is substantially free of $<C_{40}$ hydrocarbons, for example, a maximum of 5 wt. %$<C_{40}$ hydrocarbons, a maximum of 3 wt. %$<C_{40}$ hydrocarbons, etc.

Embodiment 56

A polyalphaolefin produced by the process defined in any of embodiments 48-55.

Embodiment 57

A process for forming a polyalphaolefin, the process comprising:

(1) contacting a monomer comprising any $C_6$ to $C_{24}$ normal alpha olefin disclosed herein with a catalyst system to form a dimer composition comprising trisubstituted dimers, the catalyst system comprising any metallocene compound, any chemically-treated solid oxide, and any co-catalyst disclosed herein;

(2) removing at least a portion of the monomer and/or at least a portion of higher oligomers from the dimer composition to form a trisubstituted olefin composition comprising trisubstituted dimers;

(3) contacting the trisubstituted olefin composition with any solid acid catalyst disclosed herein to form an oligomer product comprising olefin tetramers at any oligomerization temperature in a range from −20° C. to 40° C. disclosed herein;

(4) removing at least a portion of the oligomer product from the trisubstituted dimers and the solid acid catalyst to form a tetramer composition comprising olefin tetramers; and (5) hydrogenating the tetramer composition to form the polyalphaolefin.

Embodiment 58

A process for forming a polyalphaolefin, the process comprising:

(1) contacting a monomer comprising any $C_6$ to $C_{24}$ normal alpha olefin disclosed herein with a catalyst system to form a reaction product comprising dimers, the catalyst system comprising any metallocene compound disclosed herein and any aluminoxane or any non-coordinating anion activator and any alkylaluminum compound disclosed herein;

(2) removing at least a portion of the monomer and/or at least a portion of higher oligomers from the reaction product to form a vinylidene composition comprising vinylidenes;

(3) isomerizing the vinylidene composition comprising vinylidenes to form a trisubstituted olefin composition comprising trisubstituted dimers;

(4) contacting the trisubstituted olefin composition with any solid acid catalyst disclosed herein to form an oligomer product comprising olefin tetramers at any oligomerization temperature in a range from −20° C. to 40° C. disclosed herein;

(5) removing at least a portion of the oligomer product from the trisubstituted dimers and the solid acid catalyst to form a tetramer composition comprising olefin tetramers; and (6) hydrogenating the tetramer composition to form the polyalphaolefin.

Embodiment 59

A process for forming a polyalphaolefin, the process comprising:

(1) contacting a monomer comprising any $C_6$ to $C_{24}$ normal alpha olefin disclosed herein with a catalyst system to form a reaction product comprising dimers, the catalyst system comprising any alkylaluminum compound disclosed herein;

(2) removing at least a portion of the monomer and/or at least a portion of higher oligomers from the reaction product to form a vinylidene composition comprising vinylidenes;

(3) isomerizing the vinylidene composition comprising vinylidenes to form a trisubstituted olefin composition comprising trisubstituted dimers;

(4) contacting the trisubstituted olefin composition with any solid acid catalyst disclosed herein to form an oligomer product comprising olefin tetramers at any oligomerization temperature in a range from −20° C. to 40° C. disclosed herein;

(5) removing at least a portion of the oligomer product from the trisubstituted dimers and the solid acid catalyst to form a tetramer composition comprising olefin tetramers; and (6) hydrogenating the tetramer composition to form the polyalphaolefin.

Embodiment 60

A process for forming a polyalphaolefin, the process comprising:

(A) contacting a feedstock olefin comprising a $C_{20}$ trisubstituted olefin with any solid acid catalyst disclosed herein to form an oligomer product comprising a $C_{40}$ olefin at any oligomerization temperature in a range from −20° C. to 40° C. disclosed herein;

(B) removing at least a portion of the oligomer product comprising the $C_{40}$ olefin from the feedstock olefin, the acid catalyst, solvent (if utilized), etc.; and (C) hydrogenating the portion of the oligomer product comprising the $C_{40}$ olefin of step (B) to form the polyalphaolefin.

Embodiment 61

The process defined in embodiment 60, wherein the feedstock olefin comprises a compound having the structure:

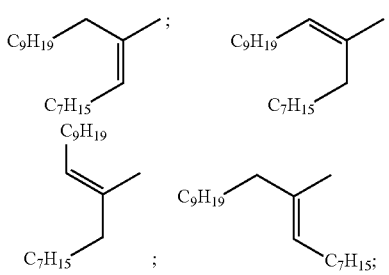

or any combination thereof.

Embodiment 62

The process defined in any of embodiments 57-61, wherein the polyalphaolefin comprises an amount of $C_{40}$ branched hydrocarbons greater than or equal to any minimum weight percentage or in a range of any weight percentages disclosed herein, for example, at least 80 wt. %, at least 85 wt. %, in a range from 80 to 99 wt. %, in a range from 80 to 95 wt. %, etc.

Embodiment 63

The process defined in any of embodiments 57-62, wherein the polyalphaolefin has a kinematic viscosity at −40° C. in any range of kinematic viscosities at −40° C. disclosed herein, for example, from 5,000 to 9,000 cSt, from 6,000 to 9,000 cSt, from 6,500 to 9,000 cSt, from 7,000 to 8,500 cSt, etc.

Embodiment 64

The process defined in any of embodiments 57-63, wherein the polyalphaolefin has a kinematic viscosity at 100° C. in any range of kinematic viscosities at 100° C. disclosed herein, for example, from 4 to 10 cSt, from 4 to 9 cSt, from 5 to 8 cSt, etc.

Embodiment 65

The process defined in any of embodiments 57-64, wherein the polyalphaolefin has a kinematic viscosity at 40° C. in any range of kinematic viscosities at 40° C. disclosed herein, for example, from 25 to 50 cSt, from 25 to 45 cSt, from 30 to 45 cSt, etc.

Embodiment 66

The process defined in any of embodiments 57-65, wherein the polyalphaolefin has a viscosity index in any range of viscosity indices disclosed herein, for example, from 120 to 150, from 125 to 145, from 130 to 140, etc.

Embodiment 67

The process defined in any of embodiments 57-66, wherein the polyalphaolefin has a pour point less than or equal to any maximum pour point or in any range of pour points disclosed herein, for example, less than or equal to −40° C., in a range from −45 to −85° C., in a range from −50 to −75° C., etc.

Embodiment 68

The process defined in any of embodiments 57-67, wherein the polyalphaolefin is substantially free of <$C_{40}$ hydrocarbons, for example, a maximum of 5 wt. %<$C_{40}$ hydrocarbons, a maximum of 3 wt. %<$C_{40}$ hydrocarbons, etc.

Embodiment 69

A polyalphaolefin produced by the process defined in any of embodiments 57-68.

Embodiment 70

A polyalphaolefin comprising at least 80 wt. % $C_{40}$ saturated branched hydrocarbons, wherein the polyalphaolefin has a kinematic viscosity at −40° C. in a range from 5,000 to 9,000 cSt.

Embodiment 71

The polyalphaolefin defined in embodiment 70, wherein the polyalphaolefin is substantially free of <$C_{40}$ hydrocarbons, for example, a maximum of 5 wt. %<$C_{40}$ hydrocarbons, a maximum of 3 wt. %<$C_{40}$ hydrocarbons, etc.

Embodiment 72

The polyalphaolefin defined in embodiment 70 or 71, wherein the polyalphaolefin has a kinematic viscosity at −40° C. in any range of kinematic viscosities at −40° C. disclosed herein, for example, from 5,500 to 9,000 cSt, from 6,000 to 9,000 cSt, from 6,500 to 9,000 cSt, from 7,000 to 8,500 cSt, etc.

Embodiment 73

The polyalphaolefin defined in any of embodiments 70-72, wherein the polyalphaolefin has a kinematic viscosity at 100° C. in any range of kinematic viscosities at 100° C. disclosed herein, for example, from 4 to 10 cSt, from 4 to 9 cSt, from 5 to 8 cSt, etc.

Embodiment 74

The polyalphaolefin defined in any of embodiments 70-73, wherein the polyalphaolefin has a kinematic viscosity at 40° C. in any range of kinematic viscosities at 40° C. disclosed herein, for example, from 25 to 50 cSt, from 25 to 45 cSt, from 30 to 45 cSt, etc.

Embodiment 75

The polyalphaolefin defined in any of embodiments 70-74, wherein the polyalphaolefin has a viscosity index in any range of viscosity indices disclosed herein, for example, from 120 to 150, from 125 to 145, from 130 to 140, etc.

Embodiment 76

The polyalphaolefin defined in any of embodiments 70-75, wherein the polyalphaolefin has a pour point less than or equal to any maximum pour point or in any range of pour points disclosed herein, for example, less than or equal to −40° C., in a range from −45 to −85° C., in a range from −50 to −75° C., etc.

Embodiment 77

The polyalphaolefin defined in any of embodiments 70-76, wherein the polyalphaolefin comprises an amount of $C_{40}$ branched hydrocarbons greater than or equal to any minimum weight percentage or in a range of any weight percentages disclosed herein, for example, at least 85 wt. %, at least 90 wt. %, in a range from 80 to 99 wt. %, in a range from 80 to 95 wt. %, etc.

We claim:

1. A polyalphaolefin comprising at least 80 wt. % $C_{40}$ saturated branched hydrocarbons, wherein the polyalphaolefin has a kinematic viscosity at −40° C. in a range from 4,500 to 9,500 cSt.

2. The polyalphaolefin of claim 1, wherein the polyalphaolefin comprises:
   from 82 to 99 wt. % $C_{40}$ branched hydrocarbons; and
   a maximum of 5 wt. %<$C_{40}$ hydrocarbons.

3. The polyalphaolefin of claim 1, wherein the polyalphaolefin has:
   a kinematic viscosity at −40° C. in a range 5,000 to 9,000 cSt;
   a kinematic viscosity at 40° C. in a range from 25 to 50 cSt;
   a kinematic viscosity at 100° C. in a range from 4 to 10 cSt;
   a viscosity index in a range from 120 to 150;
   a pour point in a range from −45 to −85° C.; or
   any combination thereof.

4. A lubricant composition comprising the polyalphaolefin of claim 1 and an additive.

5. The polyalphaolefin of claim 1, wherein the polyalphaolefin has:
   a kinematic viscosity at −40° C. in a range from 5,000 to 9,000 cSt;
   a kinematic viscosity at 40° C. in a range from 25 to 50 cSt;
   a kinematic viscosity at 100° C. in a range from 4 to 10 cSt;
   a viscosity index in a range from 120 to 150; and
   a pour point in a range from −45 to −85° C.

6. The polyalphaolefin of claim 5, wherein the polyalphaolefin comprises:
   from 82 to 99 wt. % $C_{40}$ branched hydrocarbons; and
   a maximum of 5 wt. %<$C_{40}$ hydrocarbons.

7. A lubricant composition comprising the polyalphaolefin of claim 6 and an additive.

8. The polyalphaolefin of claim 1, wherein the polyalphaolefin comprises a maximum of 5 wt. %<$C_{40}$ hydrocarbons.

9. The polyalphaolefin of claim 8, wherein the polyalphaolefin has a kinematic viscosity at −40° C. in a range from 6,500 to 9,000 cSt.

10. The polyalphaolefin of claim 1, wherein the polyalphaolefin comprises a maximum of 3 wt. %<$C_{40}$ hydrocarbons, and the polyalphaolefin has a kinematic viscosity at −40° C. in a range from 7,000 to 8,500 cSt.

11. The polyalphaolefin of claim 1, wherein the polyalphaolefin comprises from 85 to 99 wt. % $C_{40}$ branched hydrocarbons, and the polyalphaolefin has a kinematic viscosity at −40° C. in a range from 6,500 to 9,000 cSt.

12. The polyalphaolefin of claim 1, wherein the polyalphaolefin has:
   a kinematic viscosity at −40° C. in a range from 6,000 to 9,000 cSt;
   a kinematic viscosity at 40° C. in a range from 25 to 45 cSt;
   a kinematic viscosity at 100° C. in a range from 5 to 8 cSt;
   a viscosity index in a range from 125 to 145; and
   a pour point in a range from −50 to −75° C.

13. A lubricant composition comprising the polyalphaolefin of claim 12 and an additive.

14. The polyalphaolefin of claim 12, wherein the polyalphaolefin comprises:
   from 82 to 99 wt. % $C_{40}$ branched hydrocarbons; and
   a maximum of 5 wt. %<$C_{40}$ hydrocarbons.

15. The polyalphaolefin of claim 12, wherein the polyalphaolefin comprises:
   from 85 to 99 wt. % $C_{40}$ branched hydrocarbons; and
   a maximum of 3 wt. %<$C_{40}$ hydrocarbons.

* * * * *